(12) United States Patent
Hsieh et al.

(10) Patent No.: US 8,913,329 B1
(45) Date of Patent: Dec. 16, 2014

(54) IMAGE LENS ASSEMBLY

(71) Applicant: Largan Precision Co., Ltd., Taichung (TW)

(72) Inventors: Dung-Yi Hsieh, Taichung (TW);
Tsung-Han Tsai, Taichung (TW);
Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 40 days.

(21) Appl. No.: 13/931,982

(22) Filed: Jun. 30, 2013

(30) Foreign Application Priority Data

Jun. 14, 2013 (TW) .............................. 102121155 A

(51) Int. Cl.
*G02B 13/18* (2006.01)
*G02B 9/60* (2006.01)
*G02B 13/00* (2006.01)

(52) U.S. Cl.
CPC .............. *G02B 13/0015* (2013.01); *G02B 9/60* (2013.01)
USPC ............................ 359/714; 359/763; 359/764

(58) Field of Classification Search
USPC .......................................... 359/714, 763, 764
See application file for complete search history.

(56) References Cited

U.S. PATENT DOCUMENTS

| 8,810,921 B1 * | 8/2014 | Tsai et al. ..................... 359/714 |
| 2012/0287513 A1 * | 11/2012 | Hsu et al. ..................... 359/714 |

* cited by examiner

*Primary Examiner* — Scott J Sugarman
(74) *Attorney, Agent, or Firm* — CKC & Partners Co., Ltd.

(57) ABSTRACT

An image lens assembly includes, in order from an object side to an image side, a first lens element, a second lens element, a third lens element, a fourth lens element and a fifth lens element. The first lens element with positive refractive power has an object-side surface being convex in a paraxial. The second lens element with refractive power has an object-side surface being concave in a paraxial region. The third lens element with negative refractive power has an object-side surface being convex in a paraxial region and an image-side surface being concave in a paraxial region. The fourth lens element with positive refractive power has an object-side surface being concave in a paraxial region and an image-side surface being convex in a paraxial region. The fifth lens element with negative refractive power has an image-side surface being concave in a paraxial region.

25 Claims, 15 Drawing Sheets

IMAGE LENS ASSEMBLY

RELATED APPLICATIONS

The application claims priority to Taiwan Application Serial Number 102121155, filed Jun. 14, 2013, which is herein incorporated by reference.

BACKGROUND

1. Technical Field

The present disclosure relates to an image lens assembly. More particularly, the present disclosure relates to a compact image lens assembly applicable to the electronic products.

2. Description of Related Art

In recent years, with the popularity of mobile products having camera functionalities, the demand of miniaturized optical systems has been increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional compact optical system employed in a portable electronic product mainly adopts a structure of four-element lens. Due to the popularity of mobile products with high-end specifications, such as smart phones and PDAs (Personal Digital Assistants), the requirements for high resolution and image quality of modern compact optical systems have been increasing significantly. However, the conventional four-element lens structure cannot satisfy these requirements of the compact optical system.

Although other conventional optical systems with five-element lens structure usually have a rather small axial distance between the first lens element and the second lens element. It is thereby not favorable for disposing the mechanical components, such as an aperture stop or a shutter and causes restrictions in applications.

SUMMARY

According to one aspect of the present disclosure, an image lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element with refractive power has an object-side surface being concave in a paraxial region thereof. The third lens element with negative refractive power has an object-side surface being convex in a paraxial region thereof and an image-side surface being concave in a paraxial region thereof. The fourth lens element with positive refractive power has an object-side surface being concave in a paraxial region thereof and an image-side surface being convex in a paraxial region thereof. The fifth lens element with negative refractive power has an image-side surface being concave in a paraxial region thereof, wherein both of an object-side surface and the image-side surface of the fifth lens element are aspheric, and the image-side surface of the fifth lens element has at least one convex shape in an off-axis region. The image lens assembly has a total of five lens elements with refractive power. When a focal length of the second lens element is f2, a focal length of the third lens element is f3, a central thickness of the second lens element is CT2, an axial distance between the first lens element and the second lens element is T12, and an axial distance between the second lens element and the third lens element is T23, the following relationships are satisfied:

$$-0.90 < f3/|f2| < 0;$$

$$0.65 < T12/CT2 < 1.15; \text{ and}$$

$$0.75 < T12/T23 < 7.5.$$

According to another aspect of the present disclosure, an image capturing device includes the image lens assembly according to said aspect and an image sensor. The image sensor located on an image plane side of said image lens assembly.

According to still another aspect of the present disclosure, an image lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element with refractive power has an object-side surface being concave in a paraxial region thereof. The third lens element with negative refractive power has an image-side surface being concave in a paraxial region thereof. The fourth lens element with positive refractive power has an object-side surface being concave in a paraxial region thereof and an image-side surface being convex in a paraxial region thereof. The fifth lens element with negative refractive power has an mage-side surface being concave in a paraxial region thereof, wherein both of an object-side surface and the image-side surface of the fifth lens element are aspheric, and the image-side surface of the fifth lens element has at least one convex shape in an off-axis region. The image lens assembly has a total of five lens elements with refractive power. When a focal length of the second lens element is f2, a focal length of the third lens element is f3, a central thickness of the second lens element is CT2, an axial distance between the first lens element and the second lens element is T12, an axial distance between the second lens element and the third lens element is T23, a curvature radius of the object-side surface of the first lens element is R1, and a curvature radius of the image-side surface of the first lens element is R2, the following relationships are satisfied:

$$-0.90 < f3/|f2| < 0;$$

$$0.65 < T12/CT2 < 2.0;$$

$$0.75 < T12/T23 < 2.4; \text{ and}$$

$$(R1-R2)/(R1+R2) < 0.$$

According to yet another aspect of the present disclosure, an image lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element with refractive power has an object-side surface being concave in a paraxial region thereof. The third lens element with negative refractive power has an object-side surface being convex in a paraxial region thereof and an image-side surface being concave in a paraxial region thereof. The fourth lens element with positive refractive power has an object-side surface being concave in a paraxial region thereof and an image-side surface being convex in a paraxial region thereof. The fifth lens element with negative refractive power has an image-side surface being concave in a paraxial region thereof, wherein both of an object-side surface and the image-side surface of the fifth lens element are aspheric, and the image-side surface of the fifth lens element has at least one convex shape in an off-axis region. The image lens assembly has a total of five lens elements with refractive power. When a focal length of the to second lens element is f2, a focal length of the third lens element is f3, a central thickness of the second lens element is CT2, an axial distance between the first lens element and the second lens element is T12, and an axial distance between the second lens element and the third lens element is T23, the following relationships are satisfied:

$-0.90 < f3/|f2| < 0$;

$0.65 < T12/CT2 < 2.0$; and $0.75 < T12/T23 < 2.4$.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
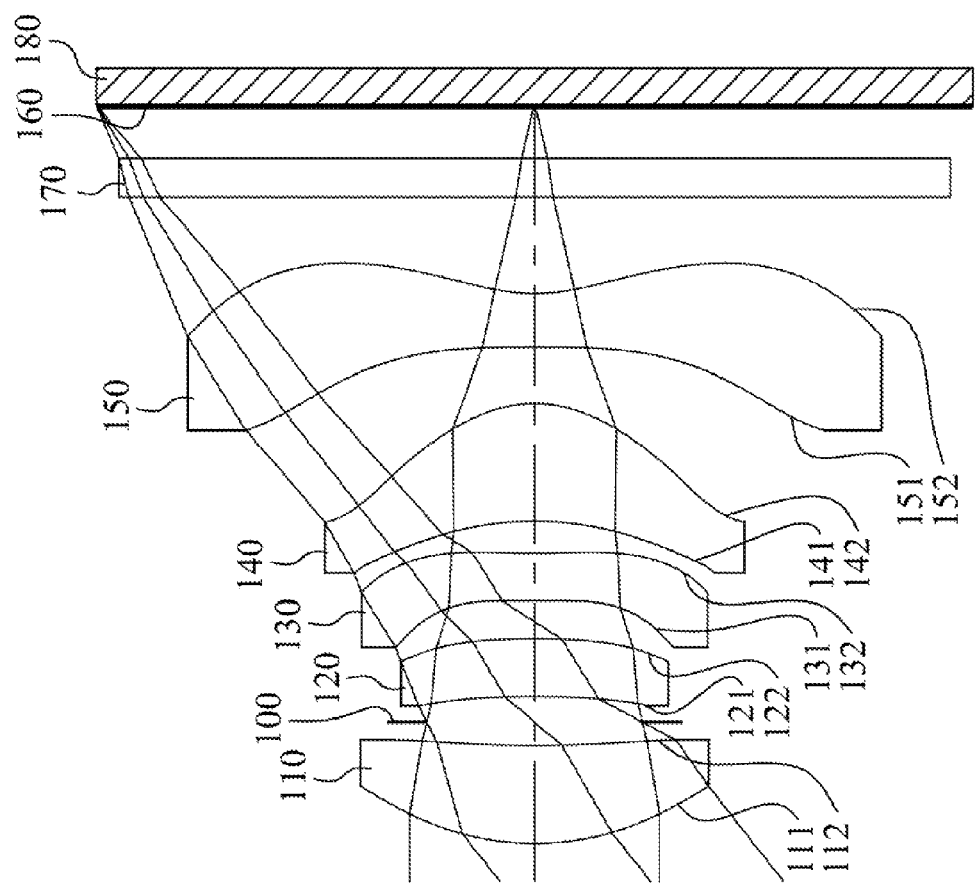
FIG. 1 is a schematic view of an image lens assembly according to the 1st embodiment of the present disclosure.

An image lens assembly includes, in order from an object side to an image side, a first lens element, a second lens element, a third lens element, a fourth lens element and a fifth lens element. The image lens assembly has a total of five lens elements with refractive power and further includes an image sensor located on an image plane side. More specifically, the image sensor can be located on an image plane.

The first lens element with positive refractive power has an object-side surface being convex in a paraxial region. Therefore, it provides the image lens assembly with the desired positive refractive power which is favorable for reducing the total track length of the image lens assembly.

The second lens element has an object-side surface being concave in a paraxial region thereof and can have an image-side surface being convex in a paraxial region thereof. Therefore, it is favorable for correcting the astigmatism.

The third lens element with negative refractive power can have an object-side surface being convex in a paraxial region thereof and has an image-side surface being concave in a paraxial region thereof, wherein the image-side surface of the third lens element can have at least one convex shape in an off-axis region. It is also favorable for reducing the incident angle of the off-axis on the image plane so as to increase the responding efficiency of the image sensor.

The fourth lens element with positive refractive power has an object-side surface being concave in a paraxial region thereof and an image-side surface being convex in a paraxial region thereof, so that it is favorable for reducing the spherical aberration and correcting the astigmatism.

The fifth lens element with negative refractive power has an image-side surface being concave in a paraxial region thereof, wherein the image-side surface of the fifth lens element has at least one convex shape in an off-axis region. Therefore, the principal point can be positioned away from the image plane so as to reduce both of the back focal length and the total track length of the image lens assembly. It is also favorable for correcting the aberration of the off-axis.

When a focal length of the second lens element is f2, and a focal length of the third lens element is f3, the following relationship is satisfied: $-0.90 < f3/|f2| < 0$. Therefore, it is favorable for balancing the refractive powers so as to reduce the aberration. Preferably, the following relationship is satisfied: $-0.70 < f3/|f2| < 0$. More preferably, the following relationship is satisfied: $-0.45 < f3/|f2| < 0$.

When an axial distance between the first lens element and the second lens element is T12, and a central thickness of the second lens element is CT2, the following relationship is satisfied: $0.65 < T12/CT2 < 2.0$. Therefore, the axial distance between the first lens element and the second lens element is proper which is favorable for disposing the mechanical components, such as the aperture stop or the shutter. Preferably, the following relationship is satisfied: $0.65 < T12/CT2 < 1.15$.

When the axial distance between the first lens element and the second lens element is T12, and an axial distance between the second lens element and the third lens element is T23, the following relationship is satisfied: $0.75 < T12/T23 < 7.5$. Therefore, it is favorable for avoiding rather small axial distance between the lens elements and overcoming difficulties in assembling so as to increase manufacturing yield rate. Preferably, the following relationship is satisfied: $0.75 < T12/T23 < 2.4$.

When a curvature radius of the object-side surface of the first lens element is R1, and a curvature radius of an image-side surface of the first lens element is R2, the following relationship is satisfied: $(R1-R2)/(R1+R2) < 0$. Therefore, it is favorable for reducing the spherical aberration and astigmatism of the image lens assembly. Preferably, the following relationship is satisfied: $(R1-R2)/(R1+R2)<-0.3$. More preferably, the following relationship is satisfied: $-2.0<(R1-R2)/(R1+R2)<-0.3$.

When a focal length of the image lens assembly is f, and the focal length of the second lens element is f2, the following relationship is satisfied: $-0.50<f/f2<0.15$. Therefore, it is favorable for balancing the refractive powers and reducing the spherical aberration and correcting the aberration.

When the central thickness of the second lens element is CT2, a central thickness of the third lens element is CT3, and a central thickness of the fourth lens element is CT4, the following relationship is satisfied: $1.05<CT4/(CT2+CT3)$ 2.5. Therefore, it provides favorable moldability and homogeneity for the lens elements during the injection molding process so as to increase manufacturing yield rate When an Abbe number of the second lens element is V2, and an Abbe number of the third lens element is V3, the following relationship is satisfied: $0.3<V3/V2<0.6$. Therefore, the chromatic aberration of the image lens assembly can be corrected.

When a focal length of the first lens element is f1 and the focal length of the third lens element is f3, the following relationship is satisfied: $-0.60<f1/f3<0$. Therefore, it is favorable for correcting the aberration.

When a curvature radius of the object-side surface of the third lens element is R5, and a curvature radius of the image-side surface of the third lens element is R6, the following relationship is satisfied: $0<R5/R6$. Therefore, it is favorable for correcting the astigmatism.

The aforementioned image lens assembly can further include a stop, such as an aperture stop, which is disposed between the first lens element and the second lens element. Therefore, it is favorable for enlarging the field of view of the image lens assembly and thereby provides a wider field of view for the same.

When the focal length of the image lens assembly is f, a focal length of the fourth lens element is f4, and a focal length of the fifth lens element is f5, the following relationship is satisfied: $2.0<f/f4+|f/f5|<5.0$. Therefore, it is favorable for balancing the refractive powers so as to keep the image lens assembly more compact.

When the central thickness of the third lens element is CT3, and a distance in parallel with an optical axis from an axial vertex on the image-side surface of the third lens element to a maximum effective diameter position on the image-side surface of the third lens element is SAG32 (when the maximum effective diameter position is closer to the object side of the image lens assembly than the axial vertex, SAG32 has a negative value; and when the maximum effective diameter position is closer to the image side of the image lens assembly than the axial vertex, SAG32 has a positive value), the following relationship is satisfied: $-1.5<SAG32/CT3<0$. Therefore, it is favorable for processing, manufacturing and assembling the image capturing system so as to keep the image lens assembly more compact.

When the curvature radius of the object-side surface of the third lens element is R5, and the curvature radius of the image-side surface of the third lens element is R6, the following relationship is satisfied: $0<(R5-R6)/(R5+R6)<1$. Therefore, it is favorable for further correcting the astigmatism.

According to the image lens assembly of the present disclosure, the lens elements thereof can be made of glass or plastic material. When the lens elements are made of glass material, the distribution of the refractive power of the image lens assembly may be more flexible to design. When the lens elements are made of plastic material, the manufacturing cost can be effectively reduced. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Therefore, the total track length of the image lens assembly can also be reduced.

According to the image lens assembly of the present disclosure, each of an object-side surface and an image-side surface has a paraxial region and an off-axis region. The paraxial region refers to the region of the surface where light rays travel close to an optical axis, and the off-axis region refers to the region of the surface where light rays travel away from the optical axis. Particularly, when the lens element has a convex surface, it indicates that the surface is convex in the paraxial region thereof; and when the lens element has a concave surface, it indicates that the surface is concave in the paraxial region thereof.

According to the image lens assembly of the present disclosure, the image lens assembly can include at least one stop, such as an aperture stop, a glare stop or a field stop. Said glare stop or said field stop is for eliminating the stray light and thereby improving the image resolution thereof.

According to the image lens assembly of the present disclosure, an aperture stop can be configured as a front stop or a middle stop. A front stop disposed between an imaged object and the first lens element can provide a longer distance between an exit pupil of the image lens assembly and an image plane and thereby improves the image-sensing efficiency of an image sensor. A middle stop disposed between the first lens element and the image plane is favorable for enlarging the field of view of the image lens assembly and thereby provides a wider field of view for the same.

According to the image lens assembly of the present disclosure, the image lens assembly is featured with good correction ability and high image quality, and can be applied to 3D (three-dimensional) image capturing applications, in products such as digital cameras, mobile devices and tablets.

According to the present disclosure, an image capturing device is provided. The image capturing device includes the image lens assembly according to the present disclosure, and an image sensor located on an image plane side of said image lens assembly. Accordingly, it is favorable for disposing mechanical components such as the aperture stop or the shutter between the axial distances of the lens elements in the image lens assembly of the image capturing device without restrictions in applications.

According to the above description of the present disclosure, the following 1st~7th specific embodiments are provided for further explanation.

1st Embodiment

Figure 2:
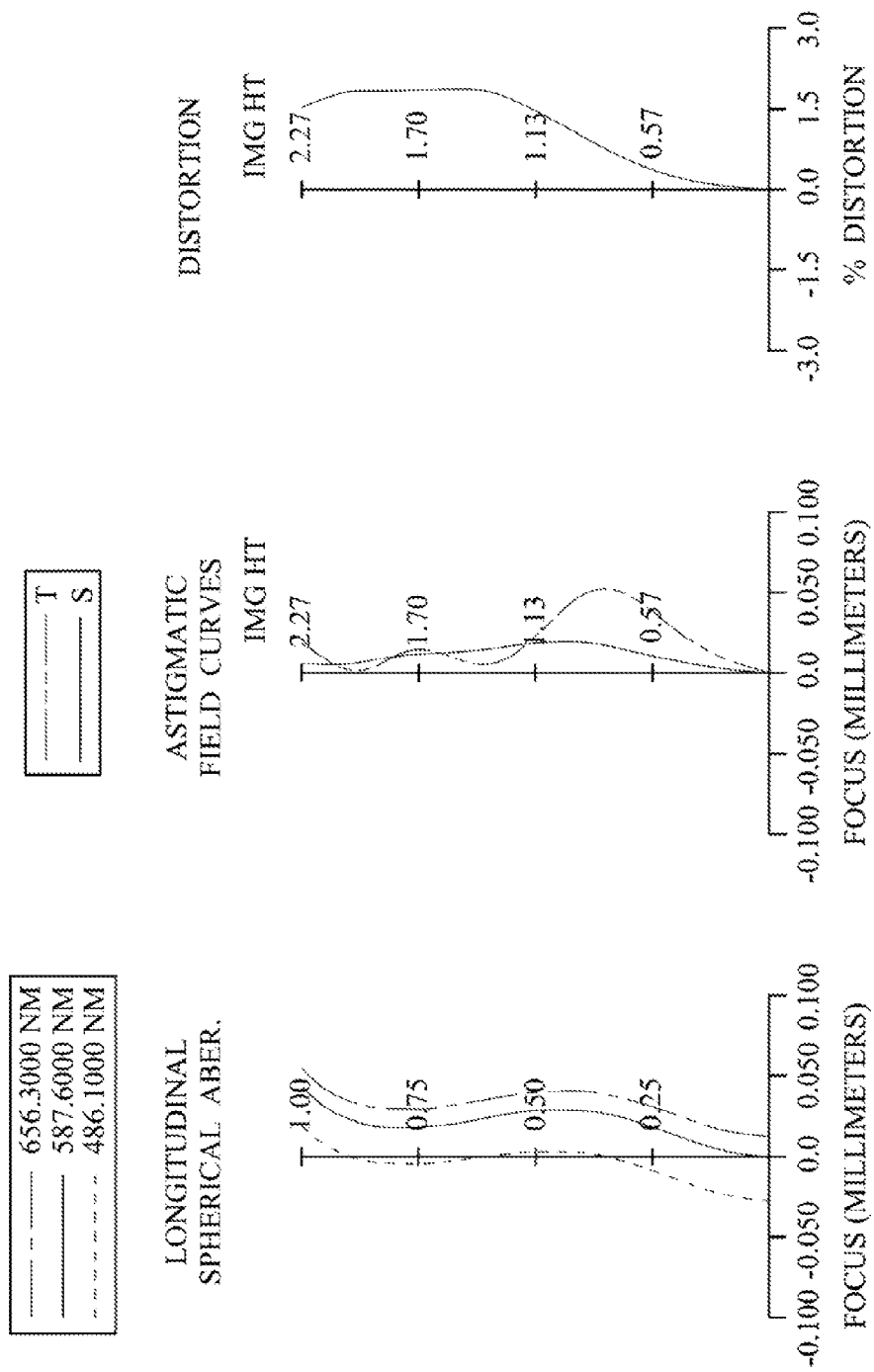
FIG. 2 shows spherical aberration curves, astigmatic field curves and a distortion curve of the image lens assembly according to the 1st embodiment.

FIG. 1 is a schematic view of an image lens assembly according to the 1st embodiment of the present disclosure. FIG. 2 shows spherical aberration curves, astigmatic field curves and a distortion curve of the image lens assembly according to the 1st embodiment. In FIG. 1, the image lens assembly includes, in order from an object side to an image side, a first lens element 110, an aperture stop 100, a second lens element 120, a third lens element 130, a fourth lens element 140, a fifth lens element 150, an IR-cut filter 170, an image plane 160 and an image sensor 180. The image lens assembly has a total of five lens elements (110-150) with refractive power.

The first lens element 110 with positive refractive power has an object-side surface 111 being convex in a paraxial region thereof and an image-side surface 112 being concave in a paraxial region thereof, and is made of plastic material. The object-side surface 111 and the image-side surface 112 of the first lens element 110 are aspheric.

The second lens element 120 with positive refractive power has an object-side surface 121 being concave in a paraxial region thereof and an image-side surface 122 being convex in a paraxial region thereof, and is made of plastic material. The object-side surface 121 and the image-side surface 122 of the second lens element 120 are aspheric.

The third lens element 130 with negative refractive power has an object-side surface 131 being convex in a paraxial region thereof and an image-side surface 132 being concave in a paraxial region thereof, and is made of plastic material. The object-side surface 131 and the image-side surface 132 of the third lens element 130 are aspheric, wherein the image-side surface 132 of the third lens element 130 has one convex shape in an off-axis region.

The fourth lens element 140 with positive refractive power has an object-side surface 141 being concave in a paraxial region thereof and an image-side surface 142 being convex in a paraxial region thereof, and is made of plastic material. The object-side surface 141 and the image-side surface 142 of the fourth lens element 140 are aspheric.

The fifth lens element 150 with negative refractive power has an object-side surface 151 being concave in a paraxial region thereof and an image-side surface 152 being concave in a paraxial region thereof, and is made of plastic material. The object-side surface 151 and the image-side surface 152 of the fifth lens element 150 are aspheric, wherein the image-side surface 152 of the fifth lens element 150 has one convex shape in an off-axis region.

The IR-cut filter 170 is made of glass and located between the fifth lens element 150 and the image plane 160, and does not affect the focal length of the image lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

, wherein,

X is the relative distance between a point on the aspheric surface spaced at a distance Y from the optical axis and the tangential plane at the aspheric surface vertex on the optical axis;

Y is the distance from the point on the curve of the aspheric surface to to the optical axis;

R is the curvature radius;

k is the conic coefficient; and

Ai is the i-th aspheric coefficient.

In the image lens assembly according to the 1st embodiment, a focal length of the image lens assembly is f, an f-number of the image lens assembly is Fno, and half of the maximal field of view of the image lens assembly is HFOV, these parameters have the following values: f=2.85 mm; Fno=2.20; and HFOV=38.0 degrees.

In the image lens assembly according to the 1st embodiment, an Abbe number of the second lens element 120 is V2, and an Abbe number of the third lens element 130 is V3, the following relationship is satisfied: V3/V2=0.43.

In the image lens assembly according to the 1st embodiment, a central thickness of the second lens element 120 is CT2, a central thickness of the third lens element 130 is CT3, a central thickness of the fourth lens element 140 is CT4, an axial distance between the first lens element 110 and the second lens element 120 is T12, and an axial distance between the second lens element 120 and the third lens element 130 is T23, the following relationships are satisfied: T12/CT2=0.83; T12/T23=1.29; and CT4/(CT2+CT3)=1.11.

Figure 15:
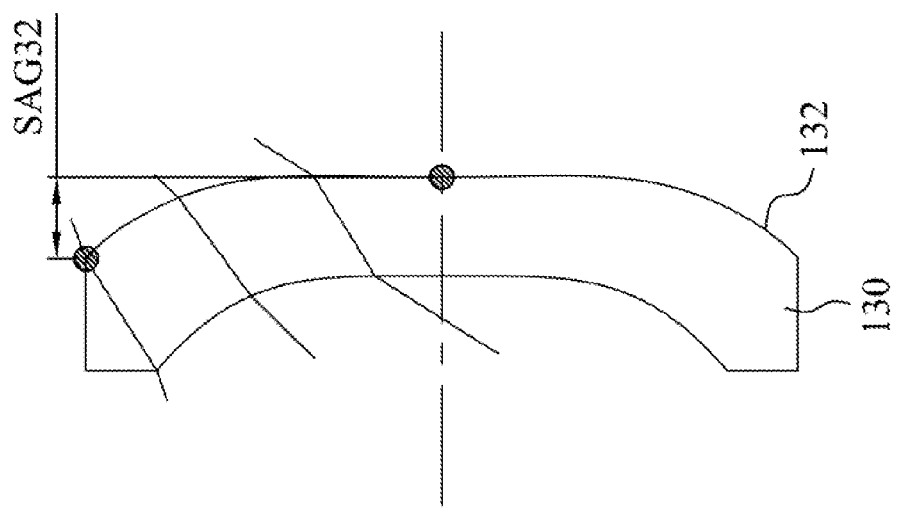
FIG. 15 shows SAG32 of an image-side surface of a third lens element of the image lens assembly according to the 1st embodiment.

FIG. 15 shows SAG32 of the image-side surface 132 of the third lens element 130 of the image lens assembly according to the 1st embodiment. In FIG. 15, the central thickness of the third lens element 130 is CT3, and a distance in parallel with an optical axis from an axial vertex on the image-side surface 132 of the third lens element 130 to a maximum effective diameter position on the image-side surface 132 of the third lens element 130 is SAG32, to the following relationship is satisfied: SAG32/CT3=−0.83.

In the image lens assembly according to the 1st embodiment, a curvature radius of the object-side surface 111 of the first lens element 110 is R1, a curvature radius of the image-side surface 112 of the first lens element 110 is R2, a curvature radius of the object-side surface 131 of the third lens element 130 is R5, and a curvature radius of the image-side surface 132 of the third lens element 130 is R6, the following relationships are satisfied: (R1−R2)/(R1+R2)=−0.61; (R5−R6)/(R5+R6)=0.78; and R5/R6=8.16.

In the image lens assembly according to the 1st embodiment, the focal length of the image lens assembly is f, a focal length of the first lens element 110 is f1, a focal length of the second lens element 120 is f2, a focal length of the third lens element 130 is f3, a focal length of the fourth lens element 140 is f4, and a focal length of the fifth lens element 150 is f5, the following relationships are satisfied: f/f2=0.06; f1/f3=−0.30; f3/|f2|=−0.23; and f/f4+|f/f5|=3.62.

The detailed optical data of the 1st embodiment are shown in Table 1 and the aspheric surface data are shown in Table 2 below.

TABLE 1

1st Embodiment
f = 2.85 mm, Fno = 2.20, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.419 | ASP | 0.508 | Plastic | 1.565 | 54.5 | 3.19 |
| 2 | | 5.820 | ASP | 0.120 | | | | |
| 3 | Ape. Stop | Plano | | 0.131 | | | | |
| 4 | Lens 2 | −5.338 | ASP | 0.303 | Plastic | 1.585 | 54.5 | 45.66 |
| 5 | | −4.513 | ASP | 0.195 | | | | |
| 6 | Lens 3 | 47.819 | ASP | 0.249 | Plastic | 1.640 | 23.3 | −10.47 |
| 7 | | 5.861 | ASP | 0.166 | | | | |
| 8 | Lens 4 | −1.568 | ASP | 0.610 | Plastic | 1.544 | 55.9 | 1.57 |
| 9 | | −0.628 | ASP | 0.289 | | | | |
| 10 | Lens 5 | −17.129 | ASP | 0.281 | Plastic | 1.535 | 55.7 | −1.58 |
| 11 | | 0.893 | ASP | 0.500 | | | | |

TABLE 1-continued

1st Embodiment
f = 2.85 mm, Fno = 2.20, HFOV = 38.0 deg.

| Surface # | | Curvature Radius | Thickness | Material | Index | Abbe # | Focal Length |
|---|---|---|---|---|---|---|---|
| 12 | IR-cut filter | Plano | 0.200 | Glass | 1.517 | 64.2 | — |
| 13 | | Plano | 0.270 | | | | |
| 14 | Image | Plano | — | | | | |

Note:
Reference wavelength is 587.6 nm (d-line).

TABLE 2

| Aspheric Coefficients | | | | | |
|---|---|---|---|---|---|
| Surface # | 1 | 2 | 4 | 5 | 6 |
| k = | −1.1210E+01 | 1.2621E+01 | 1.5262E+01 | 1.5063E+01 | 2.0000E+01 |
| A4 = | 4.5726E−01 | −4.9879E−02 | −1.0294E−01 | −3.4455E−01 | −1.0480E+00 |
| A6 = | −7.7316E−01 | 6.7068E−02 | 1.7431E−02 | 1.6004E−01 | 1.4332E+00 |
| A8 = | 1.1074E+00 | −6.8397E−01 | 2.7726E−01 | 4.8691E−01 | −8.7950E+00 |
| A10 = | −8.8340E−01 | 1.8059E+00 | −2.2978E+00 | −3.0677E+00 | 2.0366E+01 |
| A12 = | 9.4538E−02 | −2.4211E+00 | 6.3321E+00 | 6.8271E+00 | −1.5113E+01 |
| A14 = | 1.5705E−01 | 1.4344E+00 | −6.1825E+00 | −5.0912E+00 | |
| Surface # | 7 | 8 | 9 | 10 | 11 |
| k = | 9.8570E+00 | −3.0000E+01 | −3.3273E+00 | 2.0000E+01 | −7.7132E+00 |
| A4 = | −4.2255E−01 | −6.4997E−01 | −6.0498E−01 | −2.6656E−01 | −2.2124E−01 |
| A6 = | −9.3864E−01 | 1.5618E+00 | 9.7691E−01 | 2.2970E−01 | 1.9114E−01 |
| A8 = | 5.9641E+00 | −2.2610E+00 | −1.5967E+00 | −1.7223E−01 | −1.2808E−01 |
| A10 = | −1.8829E+01 | 1.1480E+00 | 1.9445E+00 | 8.4225E−02 | 5.0118E−02 |
| A12 = | 3.1819E+01 | 1.0464E+00 | −1.0780E+00 | −1.9835E−02 | −1.0472E−02 |
| A14 = | −2.6485E+01 | −1.0879E+00 | 2.1093E−01 | 1.7243E−03 | 8.9470E−04 |
| A16 = | 8.3698E+00 | | | | |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
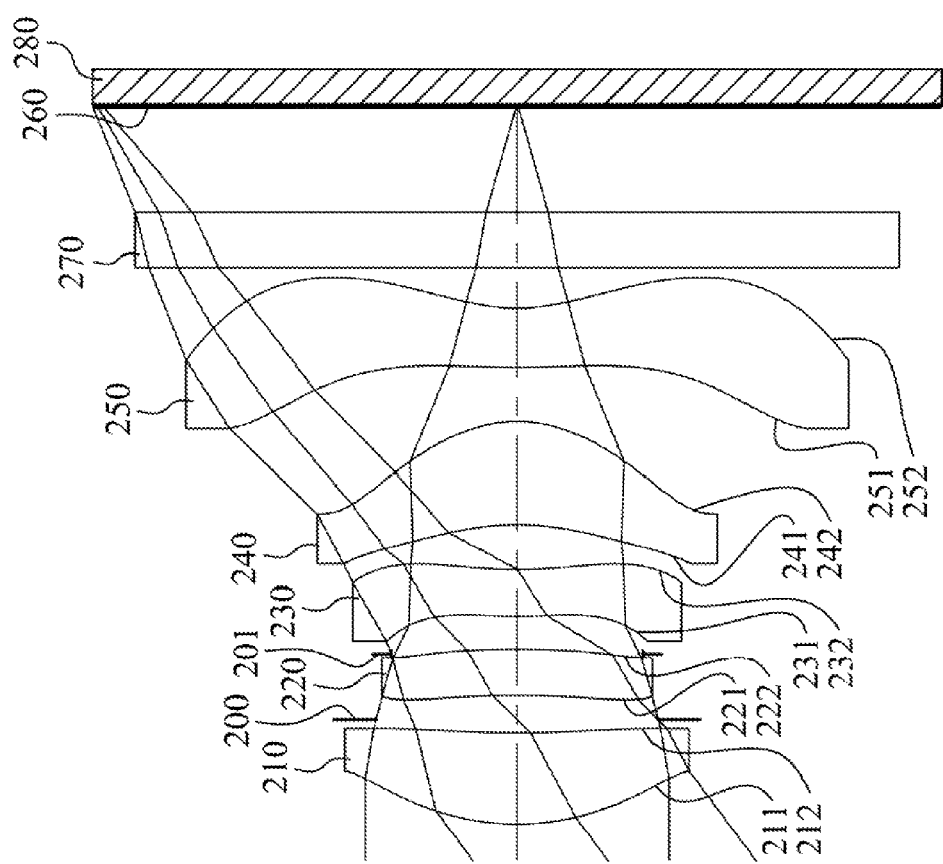
FIG. 3 is a schematic view of an image lens assembly according to the 2nd embodiment of the present disclosure.
Figure 4:
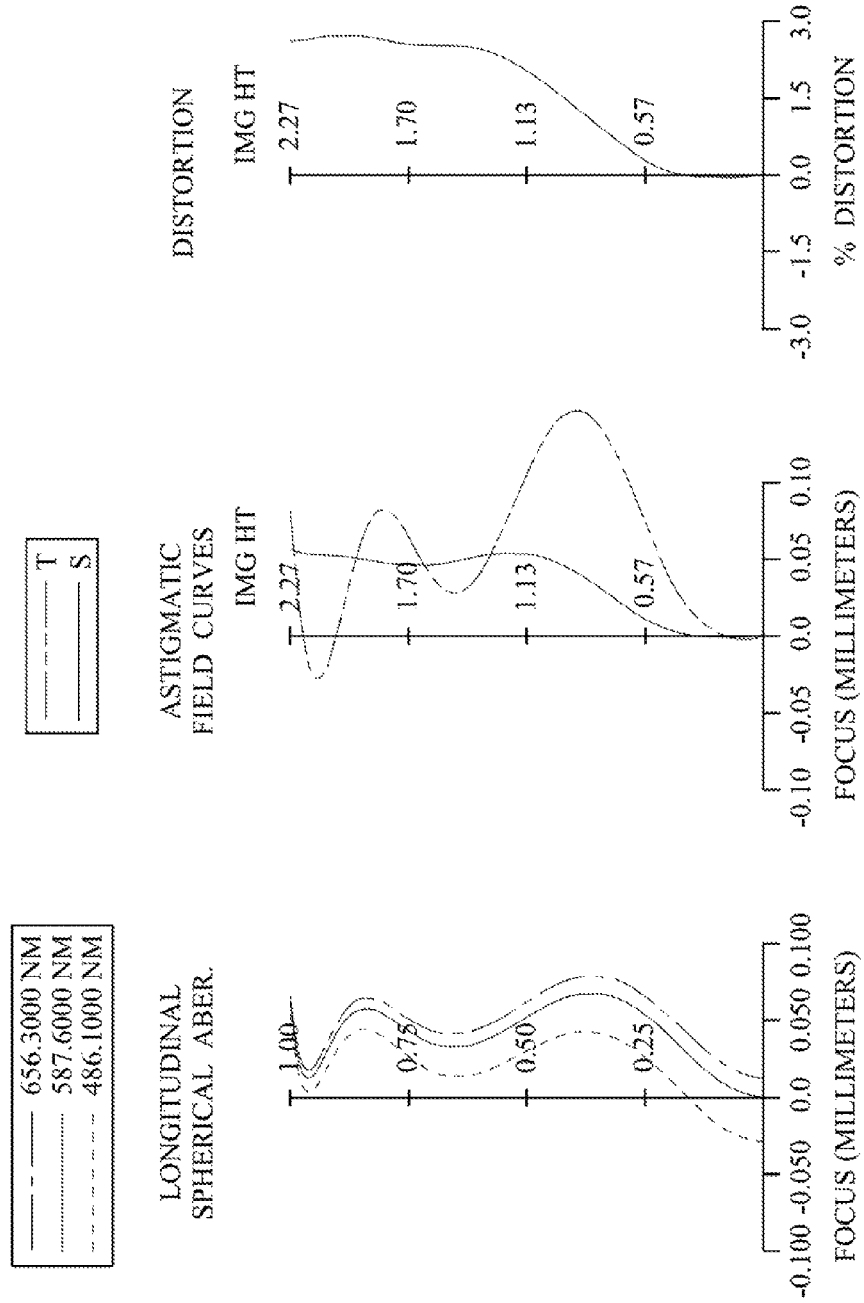
FIG. 4 shows spherical aberration curves, astigmatic field curves and a distortion curve of the image lens assembly according to the 2nd embodiment.

FIG. 3 is a schematic view of an image lens assembly according to the 2nd embodiment of the present disclosure. FIG. 4 shows spherical aberration curves, astigmatic field curves and a distortion curve of the image lens assembly according to the 2nd embodiment. In FIG. 3, the image lens assembly includes, in order from an object side to an image side, a first lens element 210, an aperture stop 200, a second lens element 220, a stop 201, a third lens element 230, a fourth lens element 240, a fifth lens element 250, an IR-cut filter 270, an image plane 260 and an image sensor 280. The image lens assembly has a total of five lens elements (210-250) with refractive power.

The first lens element 210 with positive refractive power has an object-side surface 211 being convex in a paraxial region thereof and an image-side surface 212 being concave in a paraxial region thereof, and is made of plastic material. The object-side surface 211 and the image-side surface 212 of the first lens element 210 are aspheric.

The second lens element 220 with negative refractive power has an object-side surface 221 being concave in a paraxial region thereof and an image-side surface 222 being convex in a paraxial region thereof, and is made of plastic material. The object-side surface 221 and the image-side surface 222 of the second lens element 220 are aspheric.

The third lens element 230 with negative refractive power has an object-side surface 231 being convex in a paraxial region thereof and an image-side surface 232 being concave in a paraxial region thereof, and is made of plastic material. The object-side surface 231 and the image-side surface 232 of the third lens element 230 are aspheric, wherein the image-side surface 232 of the third lens element 230 has one convex shape in an off-axis region.

The fourth lens element 240 with positive refractive power has an object-side surface 241 being concave in a paraxial region thereof and an image-side surface 242 being convex in a paraxial region thereof, and is made of plastic material. The object-side surface 241 and the image-side surface 242 of the fourth lens element 240 are aspheric.

The fifth lens element 250 with negative refractive power has an object-side surface 251 being convex a paraxial region thereof and an image-side surface 252 being concave in a paraxial region thereof, and is made of plastic material. The object-side surface 251 and the image-side surface 252 of the fifth lens element 250 are aspheric, wherein the image-side surface 252 of the fifth lens element 250 has one convex shape in an off-axis region.

The IR-cut filter 270 is made of glass and located between the fifth lens element 250 and the image plane 260, and does not affect the focal length of the image lens assembly.

The detailed optical data of the 2nd embodiment are shown in Table 3 and the aspheric surface data are shown in Table 4 below.

TABLE 3

2nd Embodiment
f = 2.95 mm, Fno = 1.80, HFOV = 36.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.375 | ASP | 0.495 | Plastic | 1.544 | 55.9 | 3.03 |
| 2 | | 7.206 | ASP | 0.070 | | | | |
| 3 | Ape. Stop | Plano | | 0.130 | | | | |
| 4 | Lens 2 | −4.575 | ASP | 0.250 | Plastic | 1.514 | 56.8 | −65.32 |
| 5 | | −5.396 | ASP | −0.027 | | | | |
| 6 | Stop | Plano | | 0.208 | | | | |
| 7 | Lens 3 | 3.928 | ASP | 0.250 | Plastic | 1.640 | 23.3 | −11.75 |
| 8 | | 2.516 | ASP | 0.243 | | | | |
| 9 | Lens 4 | −1.389 | ASP | 0.560 | Plastic | 1.544 | 55.9 | 2.02 |
| 10 | | −0.700 | ASP | 0.291 | | | | |
| 11 | Lens 5 | 5.015 | ASP | 0.320 | Plastic | 1.544 | 55.9 | −2.18 |
| 12 | | 0.939 | ASP | 0.220 | | | | |
| 13 | IR-cut filter | Plano | | 0.300 | Glass | 1.517 | 64.2 | — |
| 14 | | Plano | | 0.574 | | | | |
| 15 | Image | Plano | | — | | | | |

Note:
Reference wavelength is 587.6 nm (d-line).
Note:
The effective radius of surface 6 is 0.680 mm.

TABLE 4

Aspheric Coefficients

| Surface # | 1 | 2 | 4 | 5 | 7 |
|---|---|---|---|---|---|
| k = | −1.0115E+01 | 1.2016E+01 | −6.7878E+01 | 4.5244E+01 | 6.7395E+00 |
| A4 = | 4.5299E−01 | −8.8851E−03 | 7.0391E−02 | −1.8098E−01 | −9.2670E−01 |
| A6 = | −7.2019E−01 | −3.6764E−02 | −2.0308E−01 | −3.2462E−01 | 2.0067E+00 |
| A8 = | 8.6906E−01 | −4.8884E−01 | 8.0430E−01 | 1.2177E+00 | −1.1553E+01 |
| A10 = | −5.4858E−01 | 1.6328E+00 | −1.8949E+00 | −9.6576E−01 | 2.5306E+01 |
| A12 = | −1.3081E−01 | −2.4191E+00 | 4.5714E+00 | 1.6192E+00 | −1.8833E+01 |
| A14 = | 1.5632E−01 | 1.4373E+00 | −3.2282E+00 | −1.2809E+00 | |

| Surface # | 8 | 9 | 10 | 11 | 12 |
|---|---|---|---|---|---|
| k = | −5.2842E+00 | −1.8655E+01 | −3.0435E+00 | −3.2928E+01 | −6.4036E+00 |
| A4 = | −1.6544E−01 | −4.6869E−01 | −4.4107E−01 | −2.8149E−01 | −2.2058E−01 |
| A6 = | −1.2877E+00 | 1.7364E+00 | 8.5297E−01 | 2.2641E−01 | 1.8051E−01 |
| A8 = | 6.2622E+00 | −2.6645E+00 | −1.5773E+00 | −1.7408E−01 | −1.2289E−01 |
| A10 = | −1.8673E+01 | 1.0905E+00 | 1.9889E+00 | 8.4950E−02 | 4.9276E−02 |
| A12 = | 3.1054E+01 | 1.1299E+00 | −1.0666E+00 | −1.9609E−02 | −1.0773E−02 |
| A14 = | −2.6370E+01 | −9.2425E−01 | 1.8489E−01 | 1.6648E−03 | 9.8010E−04 |
| A16 = | 8.8879E+00 | | | | |

In the image lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| 2nd Embodiment | | | |
|---|---|---|---|
| f [mm] | 2.95 | (R1 − R2)/(R1 + R2) | −0.68 |
| Fno | 1.80 | (R5 − R6)/(R5 + R6) | 0.22 |
| HFOV [deg.] | 36.5 | R5/R6 | 1.56 |
| V3/V2 | 0.41 | f/f2 | −0.05 |
| T12/CT2 | 0.80 | f1/f3 | −0.26 |
| T12/T23 | 1.10 | f3/|f2| | −0.18 |
| CT4/(CT2 + CT3) | 1.12 | f/f4 + |f/f5| | 2.81 |
| SAG32/CT3 | −0.28 | | |

3rd Embodiment

Figure 5:
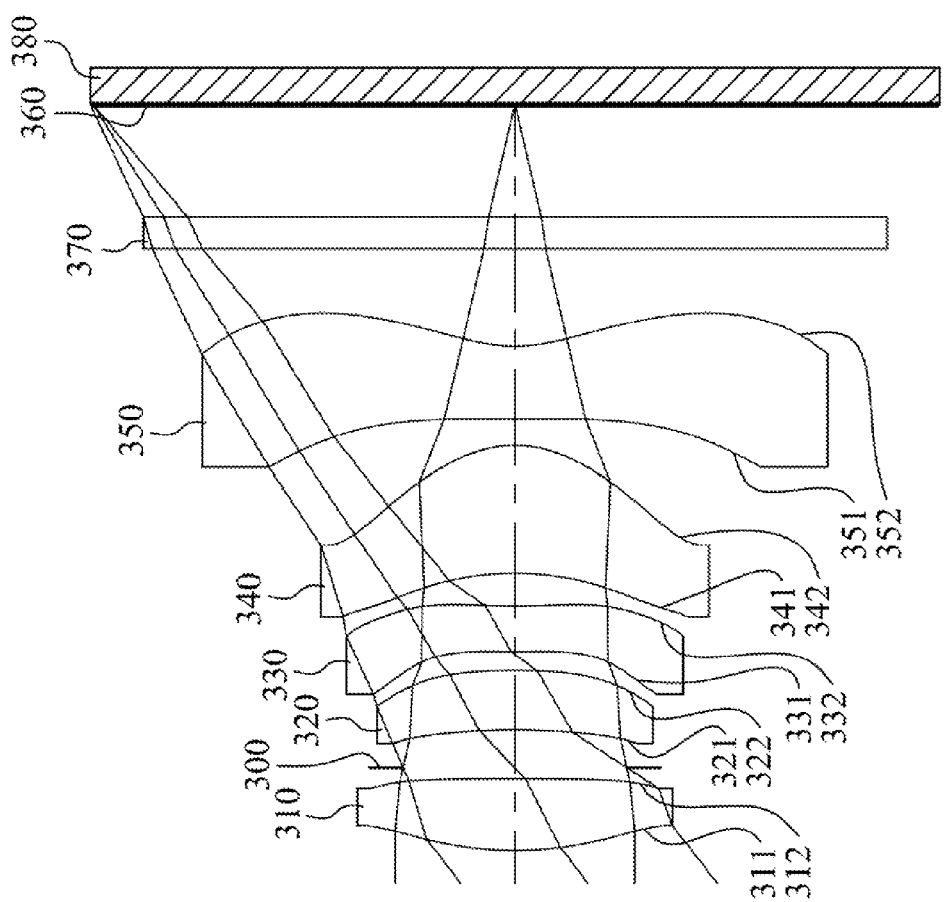
FIG. 5 is a schematic view of an image lens assembly according to the 3rd embodiment of the present disclosure.
Figure 6:
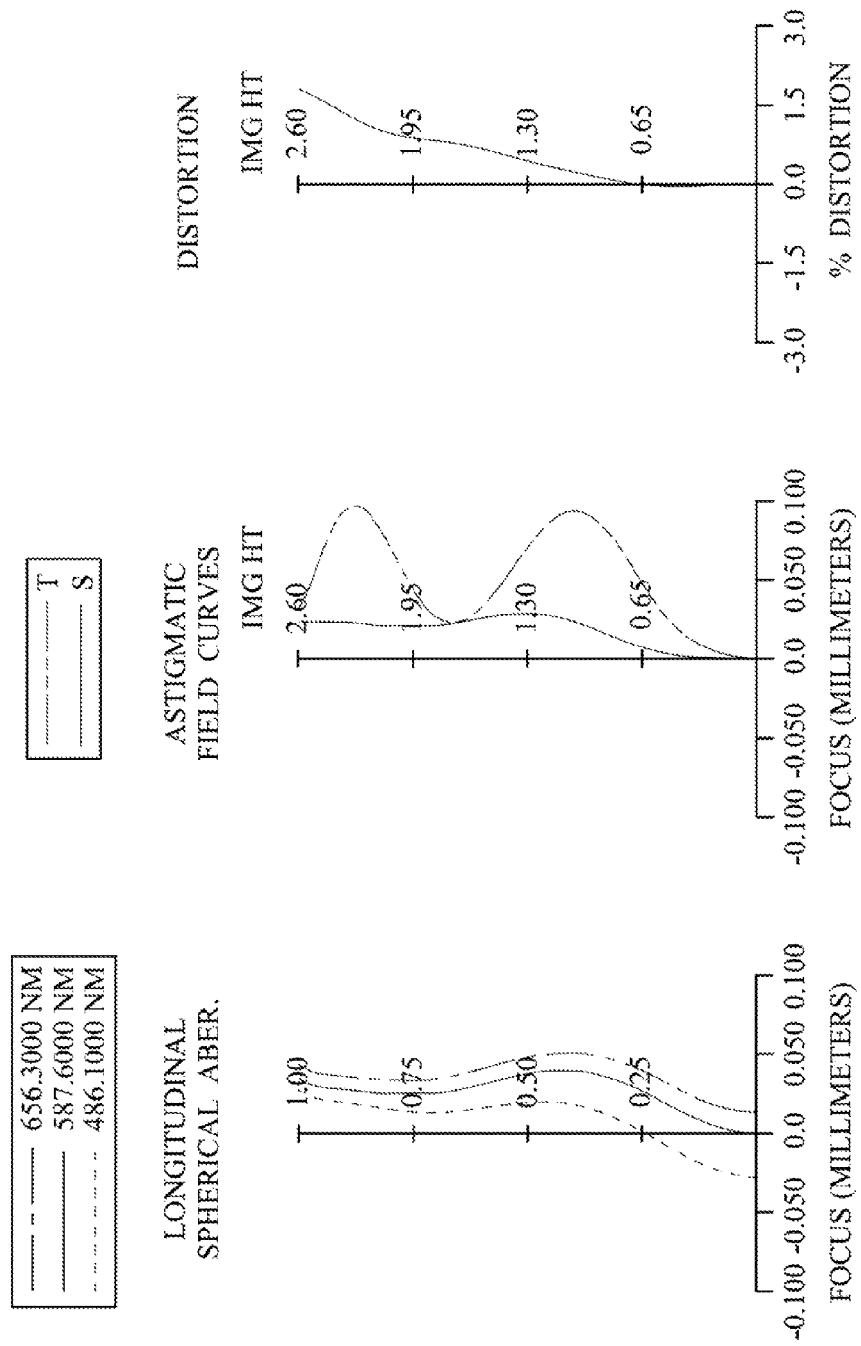
FIG. 6 shows spherical aberration curves, astigmatic field curves and a to distortion curve of the image lens assembly according to the 3rd embodiment.

FIG. 5 is a schematic view of an image lens assembly according to the 3rd embodiment of the present disclosure. FIG. 6 shows spherical aberration curves, astigmatic field curves and a distortion curve of the image lens assembly according to the 3rd embodiment. In FIG. 5, the image lens assembly includes, in order from an object side to an image side, a first lens element 310, an aperture stop 300, a second lens element 320, a third lens element 330, a fourth lens element 340, a fifth lens element 350, an IR-cut filter 370, an image plane 360 and an image sensor 380. The image lens assembly has a total of five lens elements (310-350) with refractive power.

The first lens element 310 with positive refractive power has an object-side surface 311 being convex in a paraxial region thereof and an image-side surface 312 being convex in a paraxial region thereof, and is made of plastic material. The object-side surface 311 and the image-side surface 312 of the first lens element 310 are aspheric.

The second lens element 320 with positive refractive power has an object-side surface 321 being concave in a paraxial region thereof and an image-side surface 322 being convex in a paraxial region thereof, and is made of plastic material. The object-side surface 321 and the image-side surface 322 of the second lens element 320 are aspheric.

The third lens element 330 with negative refractive power has an object-side surface 331 being convex in a paraxial region thereof and an image-side surface 332 being concave in a paraxial region thereof, and is made of plastic material. The object-side surface 331 and the image-side surface 332 of the third lens element 330 are aspheric, wherein the image-side surface 332 of the third lens element 330 has one convex shape in an off-axis region.

The fourth lens element 340 with positive refractive power has an object-side surface 341 being concave in a paraxial region thereof and an image-side surface 342 being convex in a paraxial region thereof, and is made of plastic material. The object-side surface 341 and the image-side surface 342 of the fourth lens element 340 are aspheric.

The fifth lens element 350 with negative refractive power has an object-side surface 351 being convex in a paraxial region thereof and an image-side surface 352 being concave in a paraxial region thereof, and is made of plastic material. The object-side surface 351 and the image-side surface 352 of the fifth lens element 350 are aspheric, wherein the image-side surface 352 of the fifth lens element 350 has one convex shape in an off-axis region.

The IR-cut filter 370 is made of glass and located between the fifth lens element 350 and the image plane 360, and does not affect the focal length of the image lens assembly.

The detailed optical data of the 3rd embodiment are shown in Table 5 and the aspheric surface data shown in Table 6 below.

TABLE 5

3rd Embodiment
f = 3.25 mm, Fno = 2.20, HFOV = 38.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.128 ASP | 0.446 | Plastic | 1.544 | 55.9 | 3.68 |
| 2 | | −30.806 ASP | 0.068 | | | | |
| 3 | Ape. Stop | Plano | 0.233 | | | | |
| 4 | Lens 2 | −4.069 ASP | 0.364 | Plastic | 1.544 | 55.9 | 133.03 |
| 5 | | −3.974 ASP | 0.117 | | | | |
| 6 | Lens 3 | 11.707 ASP | 0.283 | Plastic | 1.650 | 21.4 | −10.94 |
| 7 | | 4.382 ASP | 0.199 | | | | |
| 8 | Lens 4 | −1.767 ASP | 0.791 | Plastic | 1.544 | 55.9 | 1.60 |
| 9 | | −0.675 ASP | 0.162 | | | | |
| 10 | Lens 5 | 22.188 ASP | 0.449 | Plastic | 1.535 | 55.7 | −1.79 |
| 11 | | 0.910 ASP | 0.600 | | | | |
| 12 | IR-cut filter | Plano | 0.200 | Glass | 1.517 | 64.2 | — |
| 13 | | Plano | 0.693 | | | | |
| 14 | Image | Plano | — | | | | |

Note:
Reference wavelength is 587.6 nm (d-line).

TABLE 6

Aspheric Coefficients

| Surface # | 1 | 2 | 4 | 5 | 6 |
|---|---|---|---|---|---|
| k = | −2.0841E+01 | −5.1920E+00 | −1.0873E+01 | 1.8472E+01 | 1.9694E+01 |
| A4 = | 2.2824E−01 | −2.5448E−02 | 5.3586E−02 | −2.4314E−01 | −8.4800E−01 |
| A6 = | −3.7497E−01 | 3.0018E−02 | −2.0893E−01 | 7.5077E−02 | 9.8361E−01 |
| A8 = | 4.1075E−01 | −3.1125E−01 | 2.1218E−01 | 2.0868E−02 | −3.6464E+00 |
| A10 = | −3.0651E−01 | 5.1384E−01 | −6.8640E−01 | −8.3006E−01 | 6.5700E+00 |
| A12 = | 2.2359E−02 | −5.3873E−01 | 8.5507E−01 | 1.8528E+00 | −3.5737E+00 |
| A14 = | 2.6592E−02 | 2.4287E−01 | −4.7358E−01 | −8.5226E−01 | |

| Surface # | 7 | 8 | 9 | 10 | 11 |
|---|---|---|---|---|---|
| k = | −3.0000E+01 | −3.0000E+01 | −3.1873E+00 | −1.0000E+00 | −7.3605E+00 |
| A4 = | −3.3416E−01 | −4.8026E−01 | −3.7557E−01 | −1.5940E−01 | −1.4198E−01 |
| A6 = | −3.9530E−01 | 8.3678E−01 | 4.8832E−01 | 1.1165E−01 | 9.4715E−02 |
| A8 = | 2.3288E+00 | −8.5730E−01 | −6.0223E−01 | −6.8175E−02 | −4.8220E−02 |
| A10 = | −5.5349E+00 | 3.6383E−01 | 5.7412E−01 | 2.4378E−02 | 1.4521E−02 |
| A12 = | 7.1043E+00 | 2.4293E−01 | −2.3988E−01 | −4.3567E−03 | −2.3596E−03 |
| A14 = | −4.4549E+00 | −2.0951E−01 | 3.4206E−02 | 3.5739E−04 | 1.5670E−04 |
| A16 = | 1.0429E+00 | | | | |

In the image lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| 3rd Embodiment | | | |
|---|---|---|---|
| f [mm] | 3.25 | (R1 − R2)/(R1 + R2) | −1.15 |
| Fno | 2.20 | (R5 − R6)/(R5 + R6) | 0.46 |
| HFOV [deg.] | 38.0 | R5/R6 | 2.67 |
| V3/V2 | 0.38 | f/f2 | 0.02 |
| T12/CT2 | 0.83 | f1/f3 | −0.34 |
| T12/T23 | 2.57 | f3/|f2| | −0.08 |
| CT4/(CT2 + CT3) | 1.22 | f/f4 + |f/f5| | 3.85 |
| SAG32/CT3 | −0.66 | | |

4th Embodiment

Figure 7:
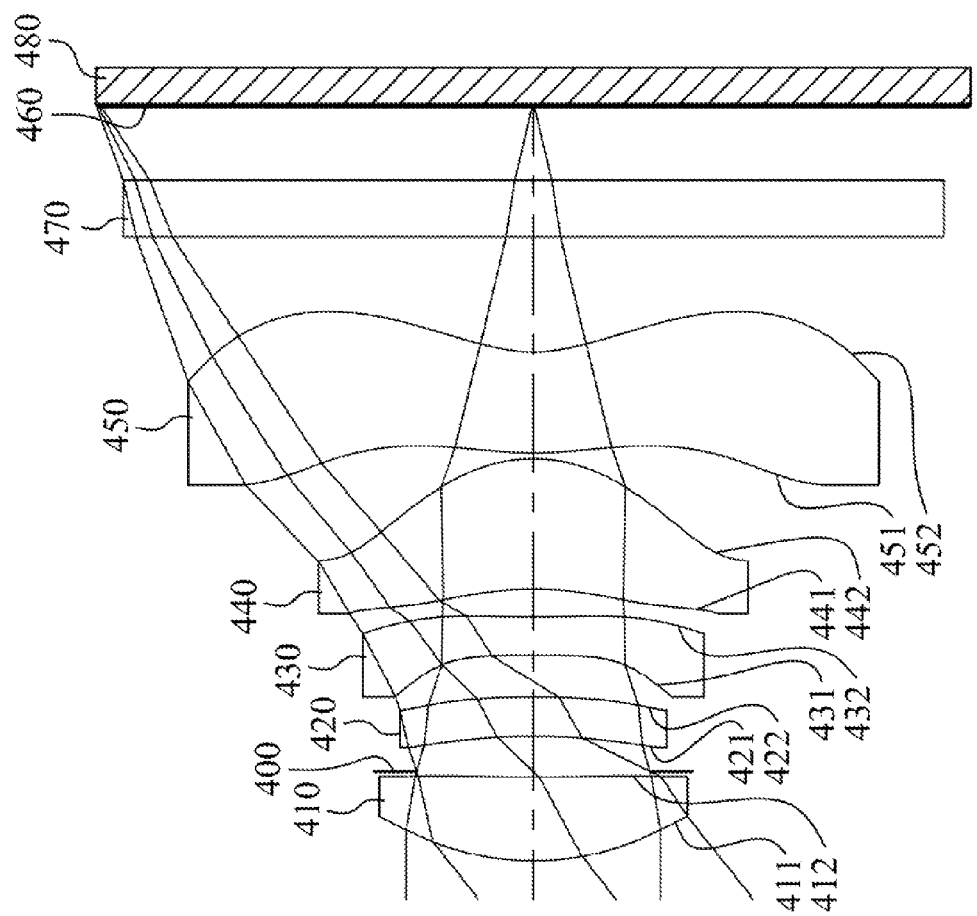
FIG. 7 is a schematic view of an image lens assembly according to the 4th embodiment of the present disclosure.
Figure 8:
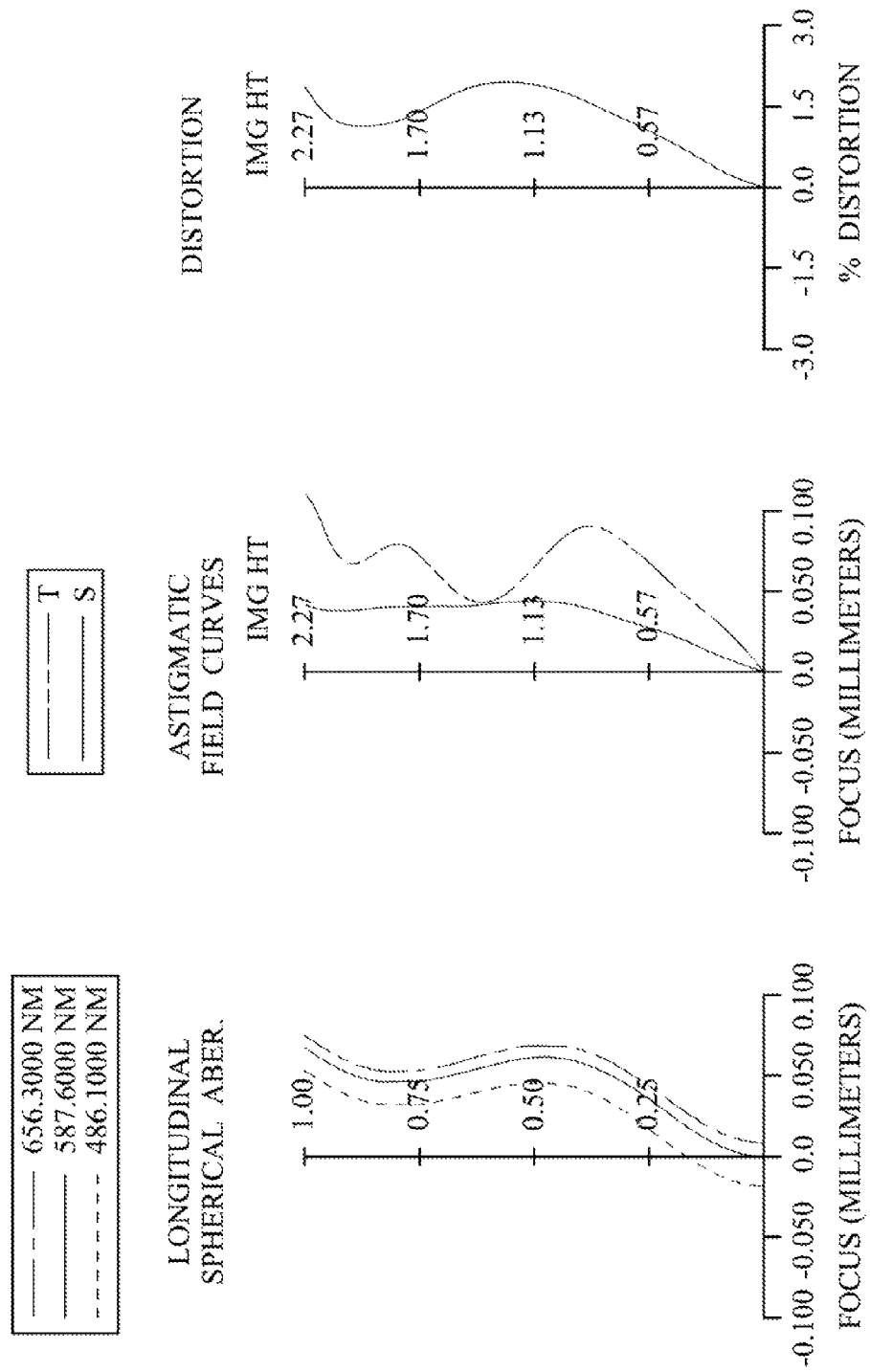
FIG. 8 shows spherical aberration curves, astigmatic field curves and a distortion curve of the image lens assembly according to the 4th embodiment.

FIG. 7 is a schematic view of an image lens assembly according to the 4th embodiment of the present disclosure. FIG. 8 shows spherical aberration curves, astigmatic field curves and a distortion curve of the image lens assembly according to the 4th embodiment. In FIG. 7, the image lens assembly includes, in order from an object side to an image side, a first lens element 410, an aperture stop 400, a second lens element 420, a third lens element 430, a fourth lens element 440, a fifth lens element 450, an IR-cut filter 470, an image plane 460 and an image sensor 480. The image lens assembly has a total of five lens elements (410-450) with refractive power.

The first lens element 410 with positive refractive power has an object-side surface 411 being convex in a paraxial region thereof and an image-side surface 412 being concave in a paraxial region thereof, and is made of plastic material. The object-side surface 411 and the image-side surface 412 of the first lens element 410 are aspheric.

The second lens element 420 with negative refractive power has an object-side surface 421 being concave in a paraxial region thereof and an image-side surface 422 being convex in a paraxial region thereof, and is made of plastic material. The object-side surface 421 and the image-side surface 422 of the second lens element 420 are aspheric.

The third lens element 430 with negative refractive power has an object-side surface 431 being convex in a paraxial region thereof and an image-side surface 432 being concave in a paraxial region thereof, and is made of plastic material. The object-side surface 431 and the image-side surface 432 of the third lens element 430 are aspheric, wherein the image-side surface 432 of the third lens element 430 has one convex shape in an off-axis region.

The fourth lens element 440 with positive refractive power has an object-side surface 441 being concave in a paraxial region thereof and an image-side surface 442 being convex in a paraxial region thereof, and is made of plastic material. The object-side surface 441 and the image-side surface 442 of the fourth lens element 440 are aspheric.

The fifth lens element 450 with negative refractive power has an object-side surface 451 being convex in a paraxial region thereof and an image-side surface 452 being concave in a paraxial region thereof, and is made of plastic material. The object-side surface 451 and the image-side surface 452 of the fifth lens element 450 are aspheric, wherein the image-side surface 452 of the fifth lens element 450 has one convex shape in an off-axis region.

The IR-cut filter 470 is made of glass and located between the fifth lens element 450 and the image plane 460, and does not affect the focal length of the image lens assembly.

The detailed optical data of the 4th embodiment are shown in Table 7 and the aspheric surface data are shown in Table 8 below.

TABLE 7

4th Embodiment
f = 2.78 mm, Fno = 2.10, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.384 | ASP | 0.439 | Plastic | 1.544 | 55.9 | 2.75 |
| 2 | | 16.635 | ASP | 0.030 | | | | |
| 3 | Ape. Stop | Plano | | 0.183 | | | | |
| 4 | Lens 2 | −3.424 | ASP | 0.202 | Plastic | 1.639 | 23.5 | −15.27 |
| 5 | | −5.396 | ASP | 0.219 | | | | |
| 6 | Lens 3 | 97.686 | ASP | 0.202 | Plastic | 1.639 | 23.5 | −11.01 |
| 7 | | 6.559 | ASP | 0.143 | | | | |
| 8 | Lens 4 | −1.483 | ASP | 0.679 | Plastic | 1.535 | 55.7 | 2.35 |
| 9 | | −0.789 | ASP | 0.030 | | | | |
| 10 | Lens 5 | 1.770 | ASP | 0.527 | Plastic | 1.535 | 55.7 | −3.31 |
| 11 | | 0.794 | ASP | 0.600 | | | | |
| 12 | IR-cut filter | Plano | | 0.300 | Glass | 1.517 | 64.2 | — |
| 13 | | Plano | | 0.387 | | | | |
| 14 | Image | Plano | | — | | | | |

Note:
Reference wavelength is 587.6 nm (d-line).

TABLE 8

Aspheric Coefficients

| Surface # | 1 | 2 | 4 | 5 | 6 |
|---|---|---|---|---|---|
| k = | −1.0862E+01 | −1.8293E+00 | 6.5504E+00 | 2.0000E+01 | 2.0000E+01 |
| A4 = | 4.6184E−01 | −2.3618E−02 | 2.9427E−02 | −1.8143E−01 | −1.0294E+00 |

TABLE 8-continued

| Aspheric Coefficients | | | | | |
|---|---|---|---|---|---|
| A6 = | −6.9200E−01 | −3.6764E−02 | −1.9999E−01 | 1.1830E−01 | 1.5642E+00 |
| A8 = | 8.0481E−01 | −4.8884E−01 | 8.0874E−01 | −2.5895E−01 | −1.0138E+01 |
| A10 = | −5.4858E−01 | 1.6328E+00 | −1.8886E+00 | −9.6994E−01 | 2.4089E+01 |
| A12 = | −1.3081E−01 | −2.4191E+00 | 4.5714E+00 | 6.7551E+00 | −1.7071E+01 |
| A14 = | 1.5632E−01 | 1.4373E+00 | −3.2379E+00 | −6.1205E+00 | |

| Surface # | 7 | 8 | 9 | 10 | 11 |
|---|---|---|---|---|---|
| k = | −7.8574E+00 | −3.0000E+01 | −2.2551E+00 | −3.0000E+01 | −5.0047E+00 |
| A4 = | −2.8741E−01 | −3.9810E−01 | −4.0519E−01 | −2.8313E−01 | −2.3403E−01 |
| A6 = | −9.8172E−01 | 1.7224E+00 | 8.6209E−01 | 2.3576E−01 | 1.9375E−01 |
| A8 = | 6.3224E+00 | −2.4430E+00 | −1.5972E+00 | −1.7290E−01 | −1.2669E−01 |
| A10 = | −1.8736E+01 | 8.4890E−01 | 1.9693E+00 | 8.4747E−02 | 4.9336E−02 |
| A12 = | 3.0925E+01 | 1.1033E+00 | −1.0737E+00 | −1.9849E−02 | −1.0536E−02 |
| A14 = | −2.6370E+01 | −8.5000E−01 | 1.9993E−01 | 1.6399E−03 | 9.4108E−04 |
| A16 = | 9.0063E+00 | | | | |

In the image lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| 4th Embodiment | | | |
|---|---|---|---|
| f [mm] | 2.78 | (R1 − R2)/(R1 + R2) | −0.85 |
| Fno | 2.10 | (R5 − R6)/(R5 + R6) | 0.87 |
| HFOV [deg.] | 38.3 | R5/R6 | 14.89 |
| V3/V2 | 1.00 | f/f2 | −0.18 |
| T12/CT2 | 1.05 | f1/f3 | −0.25 |
| T12/T23 | 0.97 | f3/|f2| | −0.72 |
| CT4/(CT2 + CT) | 1.68 | f/f4 + |f/f5| | 2.02 |
| SAG32/CT3 | −0.44 | | |

5th Embodiment

Figure 9:
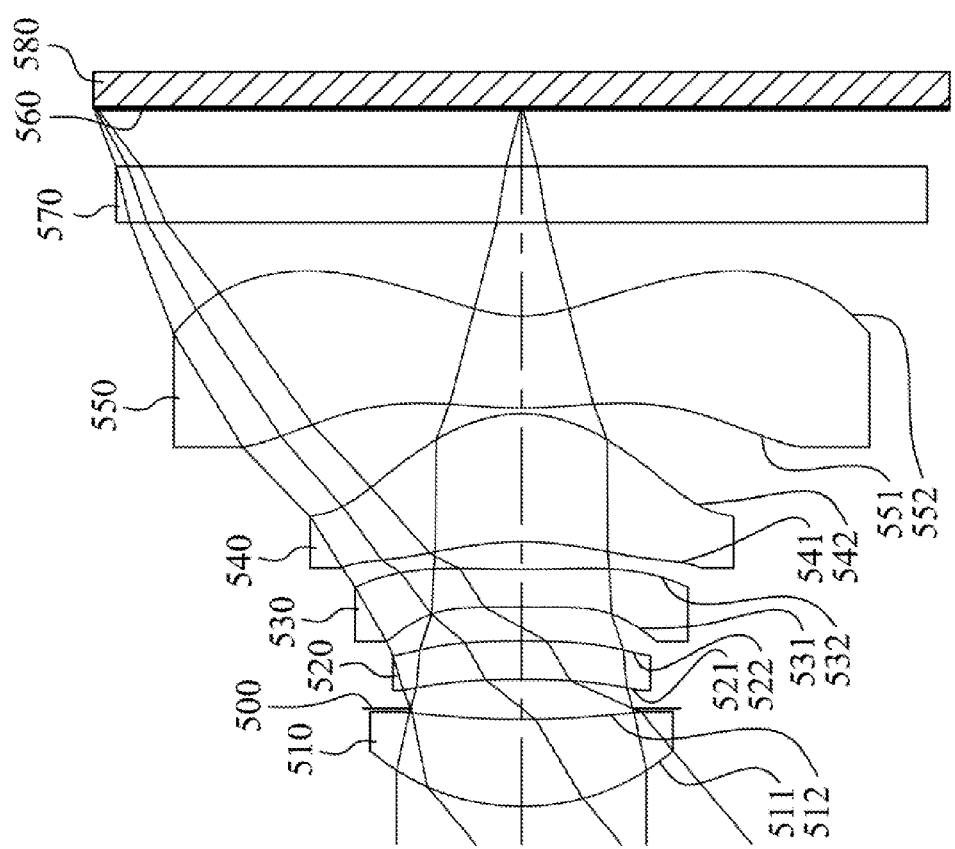
FIG. 9 is a schematic view of an image lens assembly according to the 5th embodiment of the present disclosure.
Figure 10:
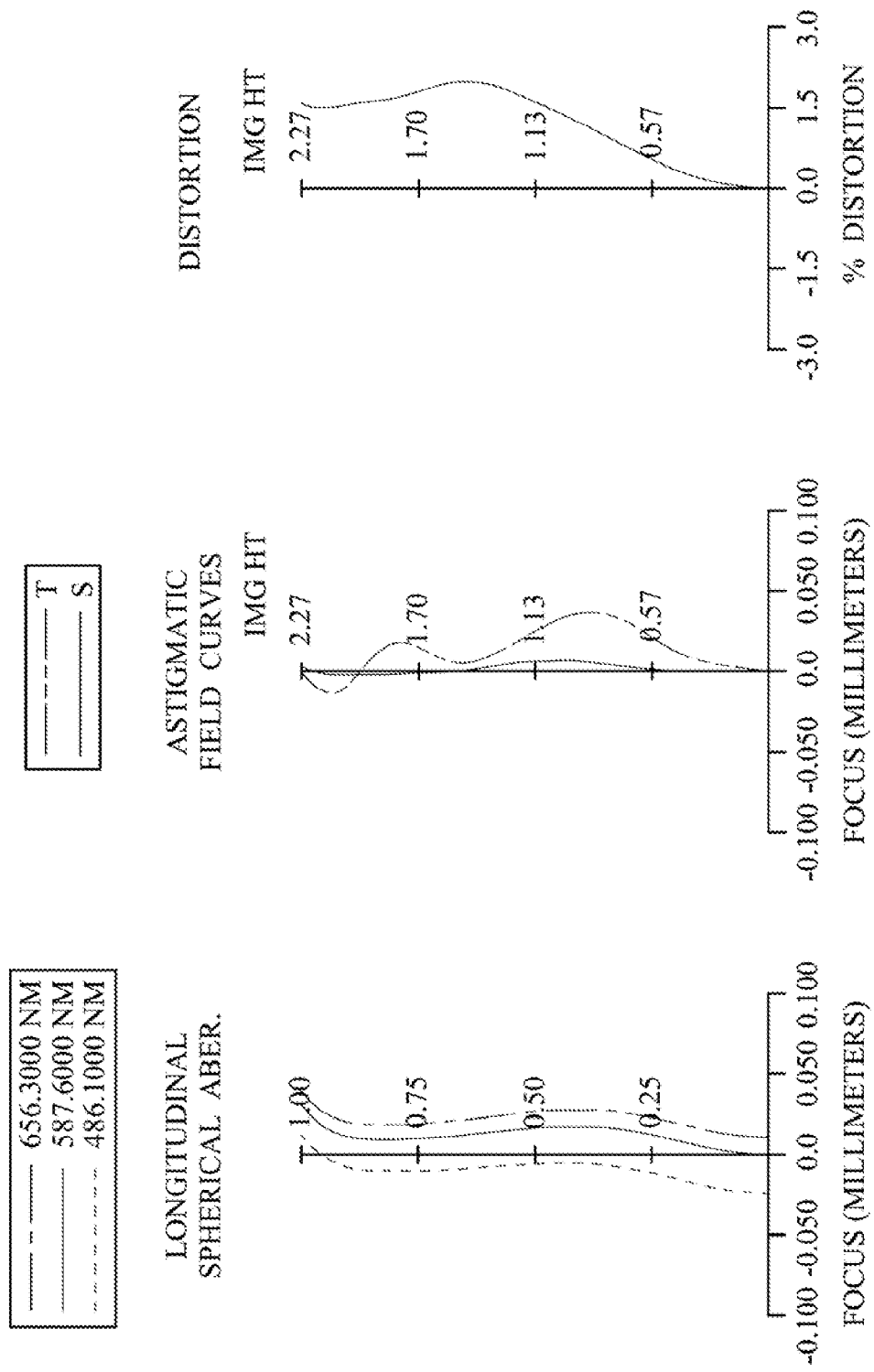
FIG. 10 shows spherical aberration curves, astigmatic field curves and a distortion curve of the image lens assembly according to the 5th embodiment.

FIG. 9 is a schematic view of an image lens assembly according to the 5th embodiment of the present disclosure. FIG. 10 shows spherical aberration curves, astigmatic field curves and a distortion curve of the image lens assembly according to the 5th embodiment. In FIG. 9, the image lens assembly includes, in order from an object side to an image side, a first lens element 510, an aperture stop 500, a second lens element 520, a third lens element 530, a fourth lens element 540, a fifth lens element 550, an IR-cut filter 570, an image plane 560 and an image sensor 580. The image lens assembly has a total of five lens elements (510-550) with refractive power.

The first lens element 510 with positive refractive power has an object-side surface 511 being convex in a paraxial region thereof and an image-side surface 512 being concave in a paraxial region thereof, and is made of plastic material. The object-side surface 511 and the image-side surface 512 of the first lens element 510 are aspheric.

The second lens element 520 with negative refractive power has an object-side surface 521 being concave in a paraxial region thereof and an image-side surface 522 being convex in a paraxial region thereof, and is made of plastic material. The object-side surface 521 and the image-side surface 522 of the second lens element 520 are aspheric.

The third lens element 530 with negative refractive power has an object-side surface 531 being convex in a paraxial region thereof and an image-side surface 532 being concave in a paraxial region thereof, and is made of plastic material. The object-side surface 531 and the image-side surface 532 of the third lens element 530 are aspheric, wherein the image-side surface 532 of the third lens element 530 has one convex shape in an off-axis region.

The fourth lens element 540 with positive refractive power has an object-side surface 541 being concave in a paraxial region thereof and an image-side surface 542 being convex in a paraxial region thereof, and is made of plastic material. The object-side surface 541 and the image-side surface 542 of the fourth lens element 540 are aspheric.

The fifth lens element 550 with negative refractive power has an object-side surface 551 being convex in a paraxial region thereof and an image-side surface 552 being concave in a paraxial region thereof, and is made of plastic material. The object-side surface 551 and the image-side surface 552 of the fifth lens element 550 are aspheric, wherein the image-side surface 552 of the fifth lens element 550 has one convex shape in an off-axis region.

The IR-cut filter 570 is made of glass and located between the fifth lens element 550 and the image plane 560, and does not affect the focal length of the image lens assembly.

The detailed optical data of the 5th embodiment are shown in Table 9 and the aspheric surface data are shown in Table 10 below.

TABLE 9

5th Embodiment
f = 2.66 mm, Fno = 2.00, HFOV = 40.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.253 ASP | 0.465 | Plastic | 1.544 | 55.9 | 3.01 |
| 2 | | 4.620 ASP | 0.058 | | | | |

TABLE 9-continued

5th Embodiment
f = 2.66 mm, Fno = 2.00, HFOV = 40.0 deg.

| Surface # | | Curvature Radius | | Thickness | Material | Index | Abbe # | Focal Length |
|---|---|---|---|---|---|---|---|---|
| 3 | Ape. Stop | Plano | | 0.155 | | | | |
| 4 | Lens 2 | −4.732 | ASP | 0.202 | Plastic | 1.639 | 23.5 | −68.28 |
| 5 | | −5.396 | ASP | 0.181 | | | | |
| 6 | Lens 3 | 14.937 | ASP | 0.202 | Plastic | 1.639 | 23.5 | −22.98 |
| 7 | | 7.365 | ASP | 0.145 | | | | |
| 8 | Lens 4 | −1.518 | ASP | 0.681 | Plastic | 1.535 | 55.7 | 1.87 |
| 9 | | −0.698 | ASP | 0.030 | | | | |
| 10 | Lens 5 | 2.349 | ASP | 0.490 | Plastic | 1.535 | 55.7 | −2.11 |
| 11 | | 0.708 | ASP | 0.500 | | | | |
| 12 | IR-cut filter | Plano | | 0.300 | Glass | 1.517 | 64.2 | — |
| 13 | | Plano | | 0.306 | | | | |
| 14 | Image | Plano | | — | | | | |

Note:
Reference wavelength is 587.6 nm (d-line).

TABLE 10

| Aspheric Coefficients | | | | | |
|---|---|---|---|---|---|
| Surface # | 1 | 2 | 4 | 5 | 6 |
| k = | −8.3698E+00 | 1.6036E+01 | −5.2595E−01 | 2.0000E+01 | 2.0000E+01 |
| A4 = | 5.1103E−01 | −2.0548E−02 | −1.1543E−01 | −2.7406E−01 | −7.5688E−01 |
| A6 = | −6.7870E−01 | −3.6764E−02 | −1.9999E−01 | −1.7656E−02 | 1.4736E−01 |
| A8 = | 9.1192E−01 | −4.8884E−01 | 8.0874E−01 | 1.2874E+00 | −4.3327E+00 |
| A10 = | −5.4858E−01 | 1.6328E+00 | −1.8886E+00 | −6.1393E+00 | 1.2491E+01 |
| A12 = | −1.3081E−01 | −2.4191E+00 | 4.5714E+00 | 1.5954E+01 | −9.1126E+00 |
| A14 = | 1.5632E−01 | 1.4373E+00 | −3.2379E+00 | −1.2476E+01 | |
| Surface # | 7 | 8 | 9 | 10 | 11 |
| k = | 1.7283E+01 | −3.0000E+01 | −3.4193E+00 | −3.0000E+01 | −5.0940E+00 |
| A4 = | −1.1685E−01 | −3.5240E−01 | −5.0968E−01 | −3.3516E−01 | −2.2303E−01 |
| A6 = | −1.4942E+00 | 1.4832E+00 | 9.0582E−01 | 2.8896E−01 | 1.8847E−01 |
| A8 = | 6.7669E+00 | −2.1208E+00 | −1.5169E+00 | −1.9031E−01 | −1.1628E−01 |
| A10 = | −1.8397E+01 | 8.0739E−01 | 1.9081E+00 | 8.4647E−02 | 4.2006E−02 |
| A12 = | 3.0118E+01 | 8.7562E−01 | −1.1153E+00 | −1.9144E−02 | −8.2160E−03 |
| A14 = | −2.6370E+01 | −7.2963E−01 | 2.3159E−01 | 1.6040E−03 | 6.6179E−04 |
| A16 = | 9.3786E+00 | | | | |

In the image lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| 5th Embodiment | | | |
|---|---|---|---|
| f [mm] | 2.66 | (R1 − R2)/(R1 + R2) | −0.57 |
| Fno | 2.00 | (R5 − R6)/(R5 + R6) | 0.34 |
| HFOV [deg.] | 40.0 | R5/R6 | 2.03 |
| V3/V2 | 1.00 | f/f2 | −0.04 |
| T12/CT2 | 1.05 | f1/f3 | −0.13 |
| T12/T23 | 1.18 | f3/|f2| | −0.34 |
| CT4/(CT2 + CT3) | 1.69 | f/f4 + |f/f5| | 2.68 |
| SAG32/CT3 | 0.47 | | |

6th Embodiment

Figure 11:
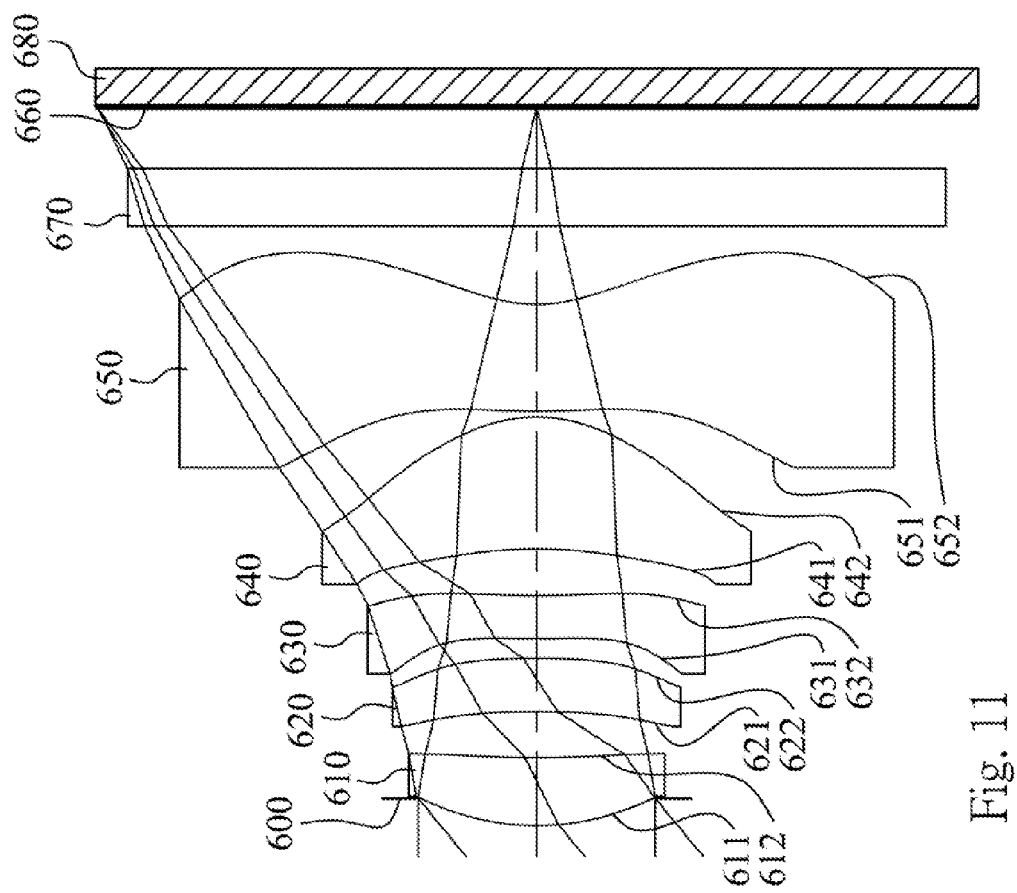
FIG. 11 is a schematic view of an image lens assembly according to the 6th embodiment of the present disclosure.
Figure 12:
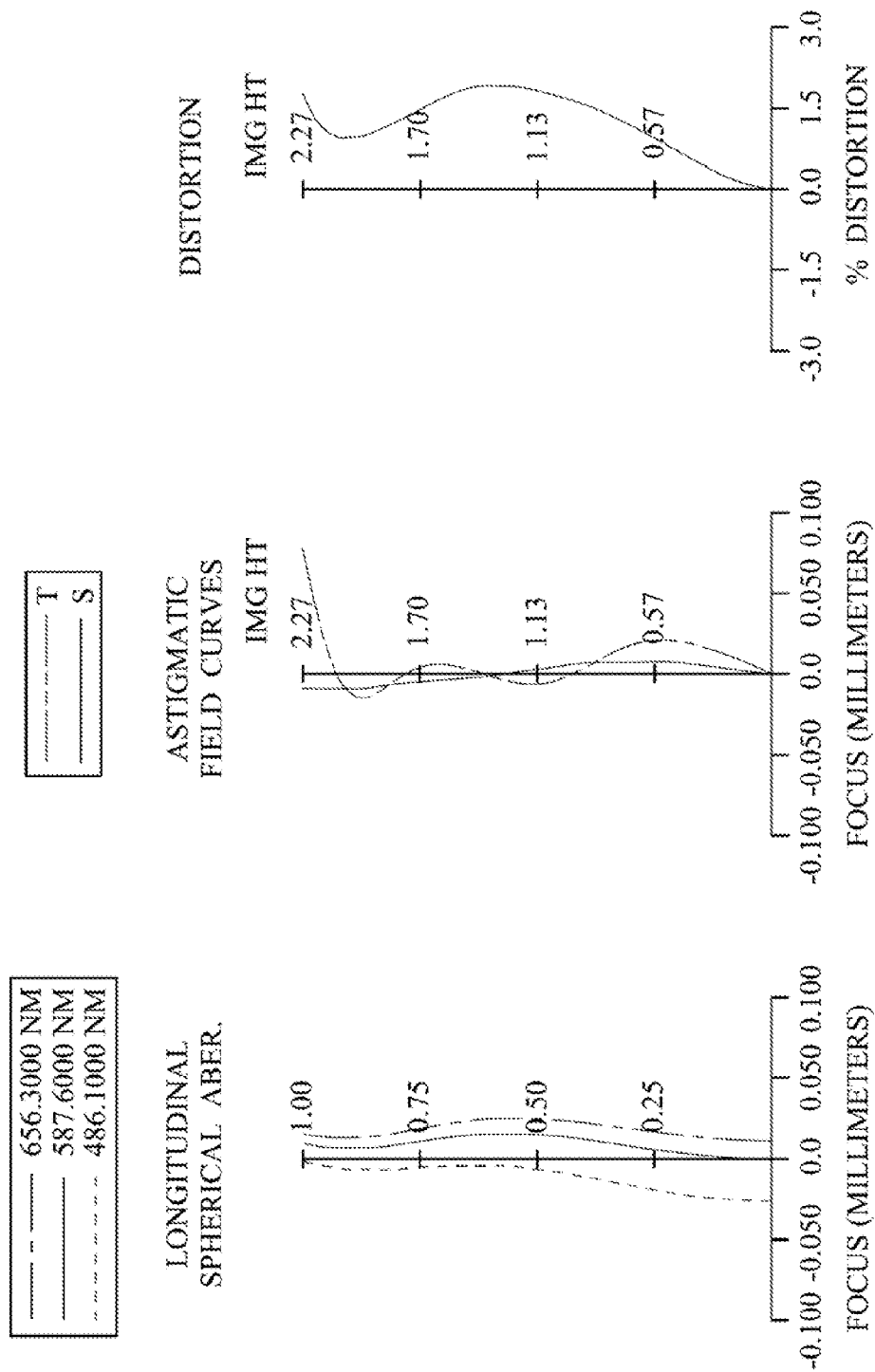
FIG. 12 shows spherical aberration curves, astigmatic field curves and a distortion curve of the image lens assembly according to the 6th embodiment.

FIG. 11 is a schematic view of an image lens assembly according to the 6th embodiment of the present disclosure. FIG. 12 shows spherical aberration curves, astigmatic field curves and a distortion curve of the image lens assembly according to the 6th embodiment. In FIG. 11, the image lens assembly includes, in order from an object side to an image side, an aperture stop 600, a first lens element 610, a second lens element 620, a third lens element 630, a fourth lens element 640, a fifth lens element 650, an IR-cut filter 670, an image plane 660 and an image sensor 680. The image lens assembly has a total of five lens elements (610-650) with refractive power.

The first lens element 610 with positive refractive power has an object-side surface 611 being convex in a paraxial region thereof and an image-side surface 612 being concave in a paraxial region thereof, and is made of plastic material. The object-side surface 611 and the image-side surface 612 of the first lens element 610 are aspheric.

The second lens element 620 with negative refractive power has an object-side surface 621 being concave in a paraxial region thereof and an image-side surface 622 being convex in a paraxial region thereof, and is made of plastic material. The object-side surface 621 and the image-side surface 622 of the second lens element 620 are aspheric.

The third lens element 630 with negative refractive power has an object-side surface 631 being convex in a paraxial region thereof and an image-side surface 632 being concave in a paraxial region thereof, and is made of plastic material. The object-side surface 631 and the image-side surface 632 of the third lens element 630 are aspheric.

The fourth lens element 640 with positive refractive power has an object-side surface 641 being concave in a paraxial region thereof and an image-side surface 642 being convex in a paraxial region thereof, and is made of plastic material. The object-side surface 641 and the image-side surface 642 of the fourth lens element 640 are aspheric.

The fifth lens element 650 with negative refractive power has an object-side surface 651 being convex in a paraxial region thereof and an image-side surface 652 being concave in a paraxial region thereof, and is made of plastic material. The object-side surface 651 and the image-side surface 652 of the fifth lens element 650 are aspheric, wherein the image-side surface 652 of the fifth lens element 650 has one convex shape in an off-axis region.

The IR-cut filter 670 is made of glass and located between the fifth lens element 650 and the image plane 660, and does not affect the focal length of the image lens assembly.

The detailed optical data of the 6th embodiment are shown in Table 11 and the aspheric surface data are shown in Table 12 below.

TABLE 11

6th Embodiment
f = 2.69 mm, Fno = 2.20, HFOV = 39.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.140 | | | | |
| 2 | Lens 1 | 1.320 ASP | 0.351 | Plastic | 1.544 | 55.9 | 2.99 |
| 3 | | 6.320 ASP | 0.234 | | | | |
| 4 | Lens 2 | −4.360 ASP | 0.277 | Plastic | 1.544 | 55.9 | −46.10 |
| 5 | | −5.396 ASP | 0.101 | | | | |
| 6 | Lens 3 | 6.999 ASP | 0.220 | Plastic | 1.639 | 23.5 | −28.01 |
| 7 | | 4.969 ASP | 0.243 | | | | |
| 8 | Lens 4 | −2.153 ASP | 0.680 | Plastic | 1.535 | 55.7 | 1.84 |
| 9 | | −0.751 ASP | 0.030 | | | | |
| 10 | Lens 5 | 3.864 ASP | 0.550 | Plastic | 1.535 | 55.7 | −1.80 |
| 11 | | 0.733 ASP | 0.400 | | | | |
| 12 | IR-cut filter | Plano | 0.300 | Glass | 1.517 | 64.2 | — |
| 13 | | Plano | 0.319 | | | | |
| 14 | Image | Plano | — | | | | |

Note:
Reference wavelength is 587.6 nm (d-line).

TABLE 12

Aspheric Coefficients

| Surface # | 2 | 3 | 4 | 5 | 6 |
|---|---|---|---|---|---|
| k = | −6.6873E+00 | 1.7312E+01 | 2.0000E+01 | 2.0000E+01 | −3.0000E+01 |
| A4 = | 3.5043E−01 | −5.1472E−02 | −8.4250E−02 | −5.4785E−01 | −7.5557E−01 |
| A6 = | −4.1087E−01 | −3.6764E−02 | −1.9999E−01 | 6.0308E−01 | −3.1392E−01 |
| A8 = | 5.2584E−01 | −4.8884E−01 | 8.0874E−01 | −1.6415E+00 | 1.0388E+00 |
| A10 = | −5.4858E−01 | 1.6328E+00 | −1.8886E+00 | 4.0217E+00 | −2.0369E+00 |
| A12 = | −1.3081E−01 | −2.4191E+00 | 4.5714E+00 | −4.2085E+00 | 2.7870E+00 |
| A14 = | 1.5632E−01 | 1.4373E+00 | −3.2379E+00 | 2.3184E+00 | |

| Surface # | 7 | 6 | 9 | 10 | 11 |
|---|---|---|---|---|---|
| k = | 1.3286E+01 | −3.0000E+01 | −3.9315E+00 | 3.4973E+00 | −4.5539E+00 |
| A4 = | −1.5100E−01 | −1.1873E−01 | −5.0658E−01 | −4.9040E−01 | −2.1368E−01 |
| A6 = | −1.3233E+00 | 2.4145E−01 | 9.3230E−01 | 3.5243E−01 | 1.7074E−01 |
| A8 = | 6.4119E+00 | −1.3308E−01 | −1.5459E+00 | −1.8824E−01 | −9.8603E−02 |
| A10 = | −1.7733E+01 | −2.2627E−01 | 1.8225E+00 | 7.8596E−02 | 3.4114E−02 |
| A12 = | 2.9100E+01 | 2.6992E−01 | −1.0992E+00 | −2.2341E−02 | −6.5554E−03 |
| A14 = | −2.6370E+01 | −1.9952E−01 | 2.5668E−01 | 3.3651E−03 | 5.3151E−04 |
| A16 = | 1.0233E+01 | | | | |

In the image lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| 6th Embodiment | | | |
|---|---|---|---|
| f [mm] | 2.69 | (R1 − R2)/(R1 + R2) | −0.65 |
| Fno | 2.20 | (R5 − R6)/(R5 + R6) | 0.17 |
| HFOV [deg.] | 39.6 | R5/R6 | 1.41 |
| V3/V2 | 0.42 | f/f2 | −0.06 |
| T12/CT2 | 0.84 | f1/f3 | −0.11 |
| T12/T23 | 2.32 | f3/|f2| | −0.61 |
| CT4/(CT2 + CT3) | 1.37 | f/f4 + |f/f5| | 2.96 |
| SAG32/CT3 | −0.24 | | |

7th Embodiment

Figure 13:
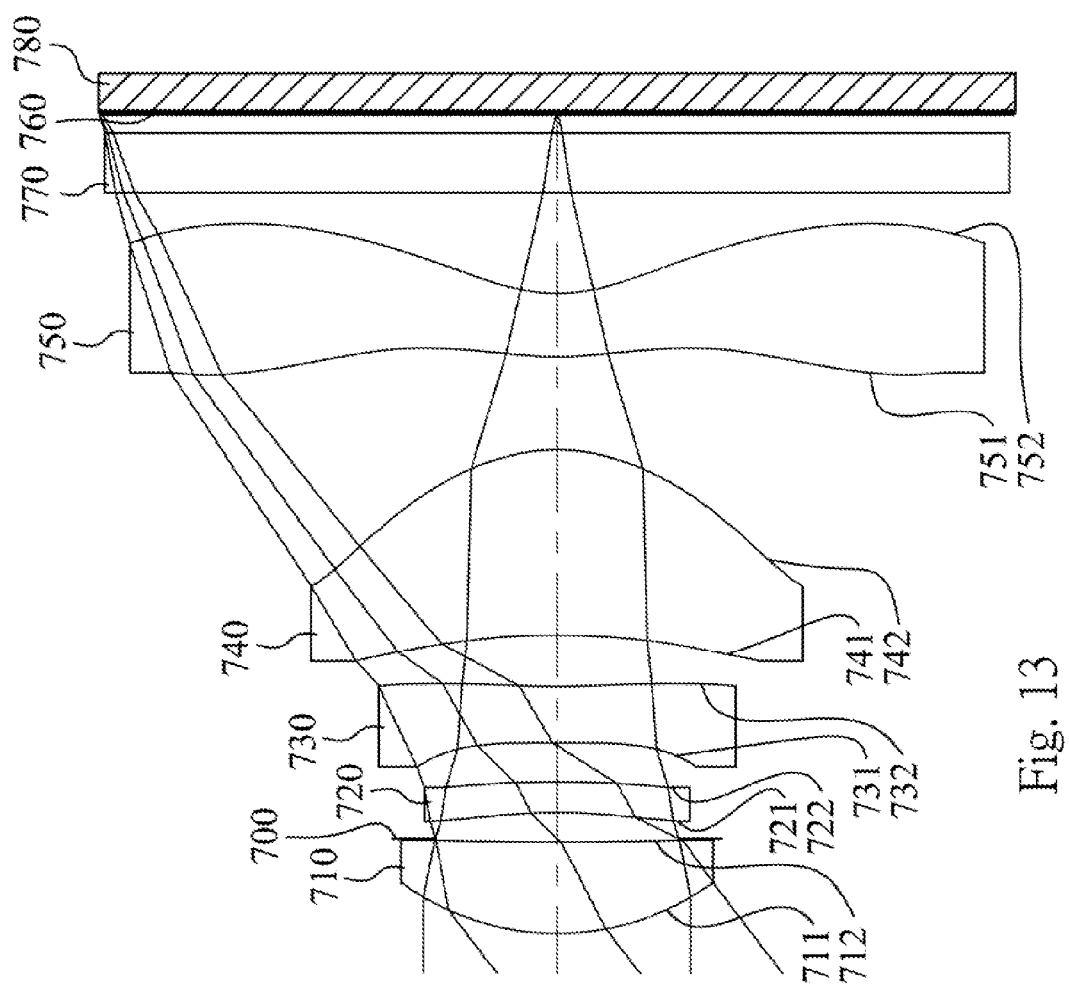
FIG. 13 is a schematic view of an image lens assembly according to the 7th embodiment of the present disclosure.
Figure 14:
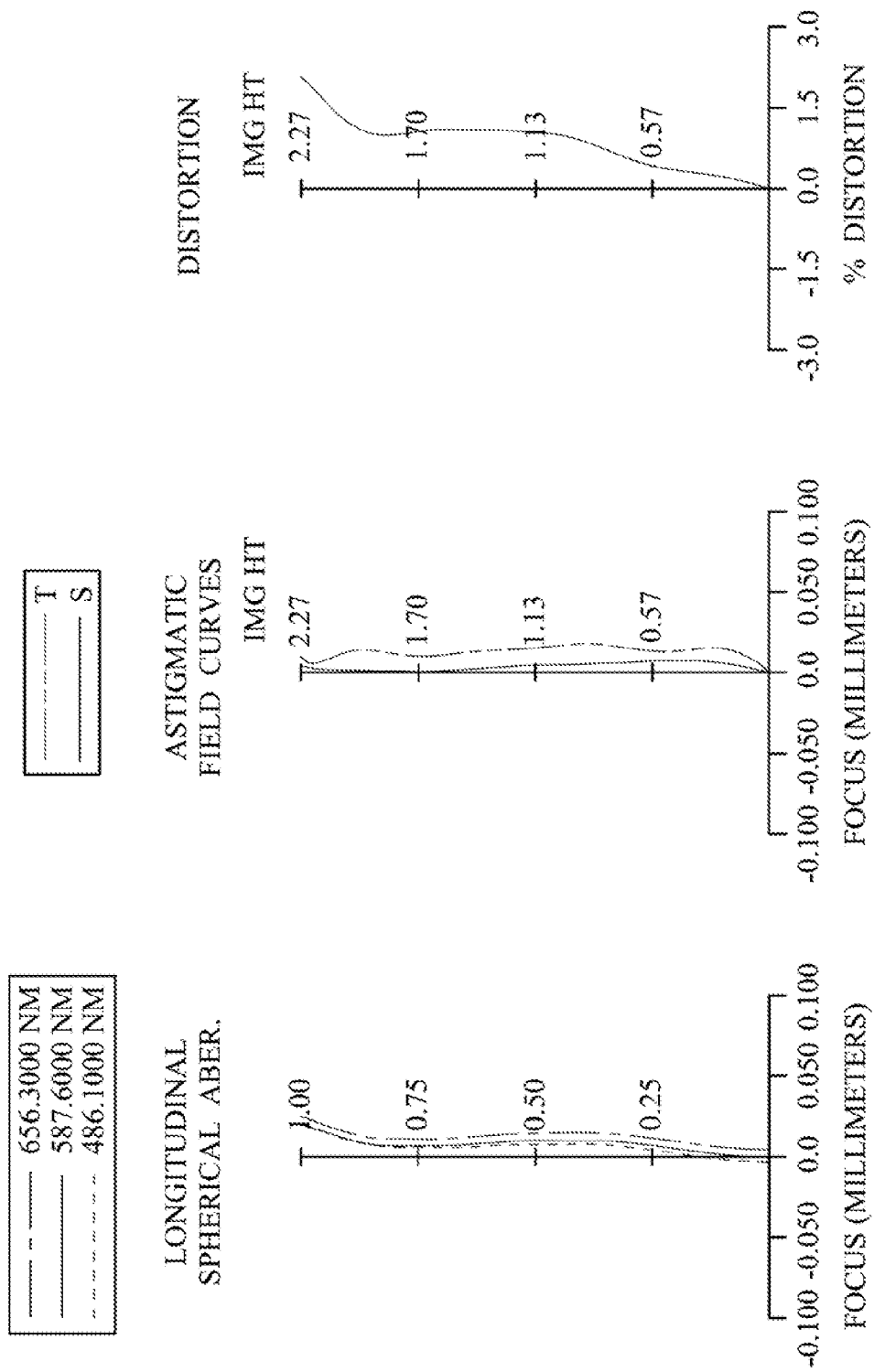
FIG. 14 shows spherical aberration curves, astigmatic field curves and a distortion curve of the image lens assembly according to the 7th embodiment.

FIG. 13 is a schematic view of an image lens assembly according to the 7th embodiment of the present disclosure. FIG. 14 shows spherical aberration curves, astigmatic field curves and a distortion curve of the image lens assembly according to the 7th embodiment. In FIG. 13, the image lens assembly includes, in order from an object side to an image side, a first lens element 710, an aperture stop 700, a second lens element 720, a third lens element 730, a fourth lens element 740, a fifth lens element 750, an IR-cut filter 770, an image plane 760 and an image sensor 780. The image lens assembly has a total of five lens elements (710-750) with refractive power.

The first lens element 710 with positive refractive power has an object-side surface 711 being convex in a paraxial region thereof and an image-side surface 712 being concave in a paraxial region thereof, and is made of plastic material. The object-side surface 711 and the image-side surface 712 of the first lens element 710 are aspheric.

The second lens element 720 with negative refractive power has an object-side surface 721 being concave in a paraxial region thereof and an image-side surface 722 being convex in a paraxial region thereof, and is made of plastic material. The object-side surface 721 and the image-side surface 722 of the second lens element 720 are aspheric.

The third lens element 730 with negative refractive power has an object-side surface 731 being concave in a paraxial region thereof and an image-side surface 732 being concave in a paraxial region thereof, and is made of plastic material. The object-side surface 731 and the image-side surface 732 of the third lens element 730 are aspheric, wherein the image-side surface 732 of the third lens element 730 has one convex shape in an off-axis region.

The fourth lens element 740 with positive refractive power has an object-side surface 741 being concave in a paraxial region thereof and an image-side surface 742 being convex in a paraxial region thereof, and is made of plastic material. The object-side surface 741 and the image-side surface 742 of the fourth lens element 740 are aspheric.

The fifth lens element 750 with negative refractive power has an object-side surface 751 being convex in a paraxial region thereof and an image-side surface 752 being concave in a paraxial region thereof, and is made of plastic material. The object-side surface 751 and the image-side surface 752 of the fifth lens element 750 are aspheric, wherein the image-side surface 752 of the fifth lens element 750 has one convex shape in an off-axis region.

The IR-cut filter 770 is made of glass and located between the fifth lens element 750 and the image plane 760, and does not affect the focal length of the image lens assembly.

The detailed optical data of the 7th embodiment are shown in Table 13 and the aspheric surface data are shown in Table 14 below.

TABLE 13

7th Embodiment
f = 2.91 mm, Fno = 2.20, HFOV = 37.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.326 | ASP | 0.450 | Plastic | 1.544 | 55.9 | 2.57 |
| 2 | | 22.263 | ASP | 0.019 | | | | |
| 3 | Ape. Stop | Plano | | 0.129 | | | | |
| 4 | Lens 2 | −2.951 | ASP | 0.153 | Plastic | 1.650 | 21.4 | −10.28 |
| 5 | | −5.396 | ASP | 0.194 | | | | |
| 6 | Lens 3 | −51.350 | ASP | 0.277 | Plastic | 1.650 | 21.4 | −6.28 |
| 7 | | 4.445 | ASP | 0.256 | | | | |
| 8 | Lens 4 | −4.078 | ASP | 0.917 | Plastic | 1.543 | 48.7 | 2.13 |
| 9 | | −0.971 | ASP | 0.464 | | | | |
| 10 | Lens 5 | 1.705 | ASP | 0.311 | Plastic | 1.583 | 30.2 | −2.41 |
| 11 | | 0.719 | ASP | 0.500 | | | | |
| 12 | IR-cut filter | Plano | | 0.300 | Glass | 1.517 | 64.2 | — |
| 13 | | Plano | | 0.100 | | | | |
| 14 | Image | Plano | | — | | | | |

Note:
Reference wavelength is 587.6 nm (d-line).

TABLE 14

| Aspheric Coefficients | | | | | |
|---|---|---|---|---|---|
| Surface # | 1 | 2 | 4 | 5 | 6 |
| k = | −7.7642E+00 | −3.0000E+01 | −1.8699E+01 | 2.0000E+01 | 2.0000E+01 |
| A4 = | 4.2788E−01 | 3.7381E−02 | 8.4493E−02 | 3.5244E−02 | −5.3533E−01 |

TABLE 14-continued

| Aspheric Coefficients | | | | |
|---|---|---|---|---|
| A6 = | −5.2493E−01 | −3.6764E−02 | −1.9999E−01 | −1.9146E−01 | 1.4695E−01 |
| A8 = | 7.3819E−01 | −4.8884E−01 | 8.0874E−01 | 1.7054E+00 | −5.2692E−02 |
| A10 = | −5.4858E−01 | 1.6328E+00 | −1.8886E+00 | −5.7116E+00 | −2.1878E−01 |
| A12 = | −1.3081E−01 | −2.4191E+00 | 4.5714E+00 | 1.1718E+01 | 3.8155E−02 |
| A14 = | 1.5632E−01 | 1.4373E+00 | −3.2379E+00 | −8.2556E+00 | |

| Surface # | 7 | 8 | 9 | 10 | 11 |
|---|---|---|---|---|---|
| k = | −2.2635E+01 | −3.0000E+01 | −3.2549E+00 | −2.9434E+01 | −5.0173E+00 |
| A4 = | −2.4110E−01 | −7.9401E−02 | −2.6525E−01 | −2.4492E−01 | −1.1456E−01 |
| A6 = | 7.7675E−02 | −7.2761E−02 | 2.6796E−01 | 1.7050E−01 | 5.4021E−02 |
| A8 = | 7.1874E−01 | 2.3815E−01 | −2.9255E−01 | −6.2876E−02 | −1.3648E−02 |
| A10 = | −1.8569E+00 | 6.9900E−03 | 1.9822E−01 | 1.3903E−02 | 1.0234E−03 |
| A12 = | 2.4129E+00 | −2.5622E−01 | −5.0224E−02 | −1.6849E−03 | 1.6175E−04 |
| A14 = | −1.8697E+00 | 1.2766E−01 | 3.2298E−03 | 8.4159E−05 | −2.3630E−05 |
| A16 = | 6.8272E−01 | | | | |

In the image lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| 7th Embodiment | | | |
|---|---|---|---|
| f [mm] | 2.91 | (R1 − R2)/(R1 + R2) | −0.89 |
| Fno | 2.20 | (R5 − R6)/(R5 + R6) | 1.19 |
| HFOV [deg.] | 37.3 | R5/R6 | −11.55 |
| V3/V2 | 1.00 | f/f2 | −0.28 |
| T12/CT2 | 0.97 | f1/f3 | −0.41 |
| T12/T23 | 0.76 | f3/|f2| | −0.61 |
| CT4/(CT2 + CT3) | 2.13 | f/f4 + |f/f5| | 2.57 |
| SAG32/CT3 | 0.01 | | |

The foregoing description, for purpose of explanation, has been described with reference to specific embodiments. It is to be noted that TABLES 1-14 show different data of the different embodiments: however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image lens assembly comprising, in order from an object side to an image side:
   a first lens element with positive refractive power having an object-side surface being convex in a paraxial region thereof;
   a second lens element with refractive power having an object-side surface being concave in a paraxial region thereof;
   a third lens element with negative refractive power having an object-side surface being convex in a paraxial region thereof and an image-side surface being concave in a paraxial region thereof;
   a fourth lens element with positive refractive power having an object-side surface being concave in a paraxial region thereof and an image-side surface being convex in a paraxial region thereof; and
   a fifth lens element with negative refractive power having an image-side surface being concave in a paraxial region thereof, wherein both of an object-side surface and the image-side surface of the fifth lens element are aspheric, and the image-side surface of the fifth lens element has at least one convex shape in an off-axis region;
   wherein the image lens assembly has a total of five lens elements with refractive power, a focal length of the second lens element is f2, a focal length of the third lens element is f3, a central thickness of the second lens element is CT2, an axial distance between the first lens element and the second lens element is T12, an axial distance between the second lens element and the third lens element is T23, and the following relationships are satisfied:

$-0.90 < f3/|f2| < 0$;

$0.65 < T12/CT2 < 1.15$; and $0.75 < T12/T23 < 7.5$.

2. The image lens assembly of claim 1, wherein the second lens element has an image-side surface being convex in a paraxial region thereof.

3. The image lens assembly of claim 2, wherein a curvature radius of the object-side surface of the first lens element is R1, a curvature radius of an image-side surface of the first lens element is R2, and the following relationship is satisfied:

$(R1−R2)/(R1+R2) < −0.3$.

4. The image lens assembly of claim 3, wherein a focal length of the image lens assembly is f, the focal length of the second lens element is f2, and the following relationship is satisfied:

$-0.50 < f/f2 < 0.15$.

5. The image lens assembly of claim 3, wherein the central thickness of the second lens element is CT2, a central thickness of the third lens element is CT3, a central thickness of the fourth lens element is CT4, and the following relationship is satisfied:

$1.05 < CT4/(CT2+CT3) < 2.5$.

6. The image lens assembly of claim 2, wherein the image-side surface of the third lens element has at least one convex shape in an off-axis region.

7. The image lens assembly of claim 2, wherein an Abbe number of the second lens element is V2, an Abbe number of the third lens element is V3, and the following relationship is satisfied:

$0.3<V3/V2<0.6.$

8. The image lens assembly of claim 1, wherein a focal length of the first lens element is f1, the focal length of the third lens element is f3, and the following relationship is satisfied:

$-0.60<f1/f3<0.$

9. The image lens assembly of claim 8, wherein a curvature radius of the object-side surface of the third lens element is R5, a curvature radius of the image-side surface of the third lens element is R6, and the following relationship is satisfied:

$0<R5/R6.$

10. The image lens assembly of claim 8, further comprising:
a stop disposed between the first lens element and the second lens element.

11. The image lens assembly of claim 1, wherein the focal length of the second lens element is f2, the focal length of the third lens element is f3, and the following relationship is satisfied:

$-0.45<f3/|f2|<0.$

12. An image capturing device, comprising;
the image lens assembly of claim 1; and
an image sensor located on an image plane side of the image lens assembly.

13. An image lens assembly comprising, in order from an object side to an image side:
a first lens element with positive refractive power having an object-side surface being convex in a paraxial region thereof;
a second lens element with refractive power having an object-side surface being concave in a paraxial region thereof;
a third lens element with negative refractive power having an image-side surface being concave in a paraxial region thereof;
a fourth lens element with positive refractive power having an object-side surface being concave in a paraxial region thereof and an image-side surface being convex in a paraxial region thereof; and
a fifth lens element with negative refractive power having an image-side surface being concave in a paraxial region thereof, wherein both of an object-side surface and the image-side surface of the fifth lens element are aspheric, and the image-side surface of the fifth lens element has at least one convex shape in an off-axis region;
wherein the image lens assembly has a total of five lens elements with refractive power, a focal length of the second lens element is f2, a focal length of the third lens element is f3, a central thickness of the second lens element is CT2, an axial distance between the first lens element and the second lens element is T12, an axial distance between the second lens element and the third lens element is T23, a curvature radius of the object-side surface of the first lens element is R1, a curvature radius of an image-side surface of the first lens element is R2, and the following relationships are satisfied:

$-0.90<f3/|f2|<0;$ $0.65<T12/CT2<2.0;$ $0.75<T12/T23<2.4;$ and $(R1-R2)/(R1+R2)<0.$ 14. The image lens assembly of claim 13, wherein the image-side surface of the third lens element has at least one convex shape in an off-axis region.

15. The image lens assembly of claim 14, wherein a focal length of the image lens assembly is f, a focal length of the fourth lens element is f4, a focal length of the fifth lens element is f5, and the following relationship is satisfied:

$2.0<f/f4+|f/f5|<5.0.$

16. The image lens assembly of claim 14, wherein the focal length of the second lens element is f2, the focal length of the third lens element is f3, and the following relationship is satisfied:

$-0.70<f3/|f2|<0.$

17. The image lens assembly of claim 13, wherein a central thickness of the third lens element is CT3, a distance in parallel with an optical axis from an axial vertex on the image-side surface of the third lens element to a maximum effective diameter position on the image-side surface of the third lens element is SAG32, and the following relationship is satisfied:

$-1.5<SAG32/CT3<0.$

18. The image lens assembly of claim 17, wherein a focal length of the image lens assembly is f, the focal length of the second lens element is f2, and to the following relationship is satisfied:

$-0.5<f/f2<0.15.$

19. The image lens assembly of claim 13, wherein a curvature radius of an object-side surface of the third lens element is R5, a curvature radius of the image-side surface of the third lens element is R6, and the following relationship is satisfied:

$0<(R5-R6)/(R5+R6)<1.$

20. The image lens assembly of claim 13, wherein a focal length of the first lens element is f1, the focal length of the third lens element is f3, and the following relationship is satisfied:

$-0.60<f1/f3<0.$

21. An image lens assembly comprising, in order from an object side to an image side:
a first lens element with positive refractive power having an object-side surface being convex in a paraxial region thereof;
a second lens element with refractive power having an object-side surface being concave in a paraxial region thereof;
a third lens element with negative refractive power having an object-side surface being convex in a paraxial region thereof and an image-side surface being concave in a paraxial region thereof;
a fourth lens element with positive refractive power having an object-side surface being concave in a paraxial region thereof and an image-side surface to being convex in a paraxial region thereof; and
a fifth lens element with negative refractive power having an image-side surface being concave in a paraxial region thereof, wherein both of an object-side surface and the image-side surface of the fifth lens element are aspheric, and the image-side surface of the fifth lens element has at least one convex shape in an off-axis region;

wherein the image lens assembly has a total of five lens elements with refractive power, a focal length of the second lens element is f2, a focal length of the third lens element is f3, a central thickness of the second lens element is CT2, an axial distance between the first lens element and the second lens element is T12, an axial distance between the second lens element and the third lens element is T23, and the following relationships are satisfied:

$-0.90 < f3/|f2| < 0;$ $0.65 < T12/CT2 < 2.0;$ and $0.75 < T12/T23 < 2.4.$

22. The image lens assembly of claim 21, wherein a curvature radius of the object-side surface of the first lens element is R1, a curvature radius of an image-side surface of the first lens element is R2, and the following relationship is satisfied:

$-2.0 < (R1-R2)/(R1+R2) < -0.3.$

23. The image lens assembly of claim 21, wherein a focal length of the image lens assembly is f, a focal length of the fourth lens element is f4, a focal length of the fifth lens element is f5, and the following relationship is satisfied:

$2.0 < f/f4 + |f/f5| < 5.0.$

24. The image lens assembly of claim 21, wherein the focal length of the second lens element is f2, the focal length of the third lens element is f3, and the following relationship is satisfied:

$-0.70 < f3/|f2| < 0.$

25. The image lens assembly of claim 21, wherein a central thickness of the third lens element is CT3, a distance in parallel with an optical axis from an axial vertex on the image-side surface of the third lens element to a maximum effective diameter position on the image-side surface of the third lens element is SAG32, and the following relationship is satisfied:

$-1.5 < SAG32/CT3 < 0.$

* * * * *